United States Patent
Saito

(10) Patent No.: US 10,538,705 B2
(45) Date of Patent: *Jan. 21, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 102 days.

This patent is subject to a terminal disclaimer.

(21) Appl. No.: 15/836,924

(22) Filed: Dec. 11, 2017

(65) Prior Publication Data
US 2018/0163138 A1    Jun. 14, 2018

(30) Foreign Application Priority Data

Dec. 13, 2016 (JP) .................................. 2016-241413
Aug. 23, 2017 (JP) .................................. 2017-160283

(51) Int. Cl.
| C09K 19/56 | (2006.01) |
| C09K 19/30 | (2006.01) |
| G02F 1/1368 | (2006.01) |
| C09K 19/54 | (2006.01) |
| C09K 19/34 | (2006.01) |
| C09K 19/12 | (2006.01) |
| C09K 19/04 | (2006.01) |

(52) U.S. Cl.
CPC .............. *C09K 19/56* (2013.01); *C09K 19/30* (2013.01); *C09K 19/3066* (2013.01); *C09K 19/3068* (2013.01); *C09K 19/34* (2013.01); *C09K 19/54* (2013.01); *G02F 1/1368* (2013.01); *C09K 2019/0448* (2013.01); *C09K 2019/122* (2013.01); *C09K 2019/123* (2013.01); *C09K 2019/301* (2013.01); *C09K 2019/3016* (2013.01); *C09K 2019/3027* (2013.01); *C09K 2019/3075* (2013.01); *C09K 2019/3078* (2013.01); *C09K 2019/3422* (2013.01); *G02F 2202/022* (2013.01)

(58) Field of Classification Search
CPC .................................................... C09K 19/56
See application file for complete search history.

(56) References Cited

U.S. PATENT DOCUMENTS

| 9,234,136 B2 | 1/2016 | Archetti et al. |
| 9,249,355 B2 | 2/2016 | Archetti et al. |
| 9,580,653 B2 | 2/2017 | Archetti et al. |
| 9,726,933 B2 | 8/2017 | Archetti et al. |
| 2013/0182202 A1 | 7/2013 | Graziano et al. |
| 2013/0314655 A1 | 11/2013 | Archetti et al. |
| 2014/0138581 A1 | 5/2014 | Archetti et al. |
| 2015/0301368 A1 | 10/2015 | Archetti et al. |
| 2015/0322342 A1 | 11/2015 | Archetti et al. |
| 2017/0369418 A1* | 12/2017 | Tanaka ................. C07D 309/06 |

FOREIGN PATENT DOCUMENTS

| JP | S50-35076 | 4/1975 |
| WO | 2012038026 | 3/2012 |
| WO | 2012104008 | 8/2012 |
| WO | 2013004372 | 1/2013 |
| WO | 2014090362 | 6/2014 |
| WO | 2014094959 | 6/2014 |

* cited by examiner

Primary Examiner — Chanceity N Robinson
(74) Attorney, Agent, or Firm — JCIPRNET

(57) ABSTRACT

A liquid-crystal-composition has negative-dielectric-anisotropy and contains at least one compound selected from polar compounds represented by formula (1) as first-additive and at least one compound selected from compounds represented by formula (2) as first-component, and a liquid-crystal-display-device includes the composition. In formulas (1) and (2), $R^1$ is hydrogen, halogen or 1-12C alkyl, $R^2$ is a group represented by —OH, —$OR^0$, —$NH_2$, —$NHR^0$ or —$N(R^0)_2$, in which $R^0$ is 1-5C alkyl; $R^3$ and $R^4$ are independently 1-12C alkyl or 2-12C alkenyl; rings A, B and C are independently 1,4-cyclohexylene or 1,4-phenylene; ring D is 1,4-phenylene in which at least one hydrogen is replaced by fluorine or chlorine; $Z^1$, $Z^2$ and $Z^3$ are independently single-bond; $Sp^1$ and $Sp^2$ are independently single-bond, 1-7C alkylene; a is 0 to 4; and b is 0 to 1.

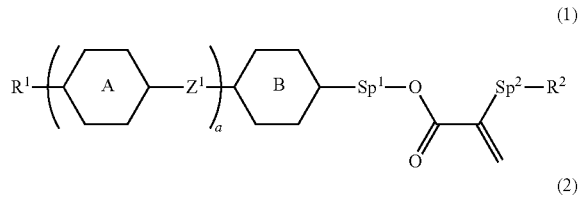

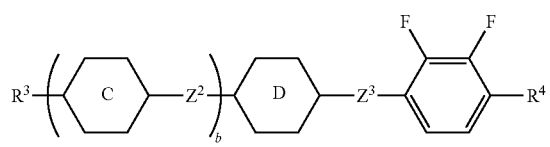

20 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefits of Japanese application serial no. 2017-160283, filed on Aug. 23, 2017, and Japanese application serial no. 2016-241413, filed on Dec. 13, 2016. The entirety of the above-mentioned patent application is hereby incorporated by reference herein and made a part of this specification.

TECHNICAL FIELD

The invention relates to a liquid crystal composition having negative dielectric anisotropy, a liquid crystal display device including the composition, and so forth. In particular, the invention relates to a liquid crystal composition that contains a polar compound having a polymerizable group (or a polymer thereof), and can achieve vertical alignment of liquid crystal molecules by action of the above compounds, and a liquid crystal display device.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, small viscosity in the composition is preferred. Small viscosity at low temperature is further preferred.

TABLE 1

General characteristics of composition and AM device

| No. | General characteristics of composition | General characteristics of AM device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having the VA mode, the value is in the range from about 0.30 micrometer to about 0.40 micrometer, and in a device having the IPS mode or the FFS mode, the value is in the range from about 0.20 micrometer to about 0.30 micrometer. In the above cases, a composition having large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having large specific resistance at room temperature and also at a temperature close to the maximum temperature of the nematic phase in an initial stage is preferred. The composition having large specific resistance at room temperature and also at a temperature close to the maximum temperature of the nematic phase even after the device has been used for a long period of time is preferred. Stability of the composition to ultraviolet light and heat relates to a service life of the device. In the case where the stability is high, the device has a long service life. Such characteristics are preferred for an AM device use in a liquid crystal projector, a liquid crystal television and so forth.

In a general-purpose liquid crystal display device, vertical alignment of liquid crystal molecules is achieved by a specific polyimide alignment film. In a polymer sustained alignment (PSA) mode liquid crystal display device, an effect of a polymer is utilized. First, a composition to which a small amount of a polymerizable compound is added is injected into the device. Next, the composition is irradiated with ultraviolet light while voltage is applied between substrates of the device. The polymerizable compound is polymerized to faun a network structure of the polymer in the composition. In the composition, alignment of liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

Meanwhile, in a liquid crystal display device having no alignment film, a liquid crystal composition containing a polar compound having no polymer and no polymerizable group is used (Patent literature Nos. 1 to 5). First, a composition to which a small amount of a polymerizable compound and a small amount of the polar compound are added is injected into the device. Here, the polar compound is adsorbed on a substrate surface and is arranged. The liquid crystal molecules are aligned according to the above alignment. Then, the composition is irradiated with ultraviolet light while voltage is applied between substrates of the device. Here, the polymerizable compound is polymerized to stabilize the alignment of the liquid crystal molecules. In the composition, the alignment of the liquid crystal molecules can be controlled by the polymer and the polar compound, and therefore the response time of the device is shortened and image persistence is improved. Further, in a device having no alignment film, a process of forming the alignment film is unnecessary. No alignment film is applied thereto, and therefore no reduction of electric resistance of the device is caused by interaction between the alignment film and the composition. Such an effect caused by a combination of the polymer and the polar compound can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In a polymer sustained alignment mode AM device, a composition having positive or negative dielectric anisotropy is used. Examples of the liquid crystal composition having the negative dielectric anisotropy are disclosed in Patent literature Nos. 1 to 6 described below. In the present invention, the above composition obtained by combining a polar compound having a polymerizable group, in place of the polymerizable compound and the polar compound, with a liquid crystal compound is used for a liquid crystal device having no alignment film.

CITATION LIST

Patent Literature

Patent literature No. 1: WO 2014/090362 A.
Patent literature No. 2: WO 2014/094959 A.
Patent literature No. 3: WO 2013/004372 A.
Patent literature No. 4: WO 2012/104008 A.
Patent literature No. 5: WO 2012/038026 A.
Patent literature No. 6: JP S50-35076 A.

SUMMARY OF INVENTION

The invention provides a liquid crystal composition that contains a polar compound having a polymerizable group, in which the polar compound has high compatibility with a liquid crystal compound. The invention further provides the liquid crystal composition that can achieve vertical alignment of liquid crystal molecules by action of a polymer formed from the polar compound. The invention further provides a liquid crystal composition satisfying at least one of characteristics such as high maximum temperature of a nematic phase, low minimum temperature of the nematic phase, small viscosity, suitable optical anisotropy, large negative dielectric anisotropy, large specific resistance, high stability to ultraviolet light and high stability to heat. The invention further provides a liquid crystal composition having a suitable balance regarding at least two of the characteristics. The invention further provides a liquid crystal display device including such a composition. The invention further provides an AM device having characteristics such as a short response time, a large voltage holding ratio, low threshold voltage, a large contrast ratio and a long service life.

The invention concerns a liquid crystal composition that has negative dielectric anisotropy, and contains at least one compound selected from the group of polar compounds represented by formula (1) as a first additive, and at least one compound selected from the group of compounds represented by formula (2) as a first component, and concerns a liquid crystal display device including the composition:

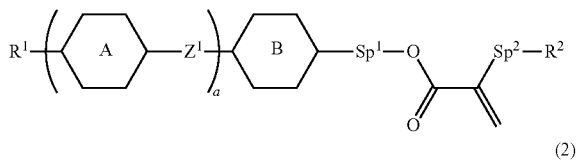

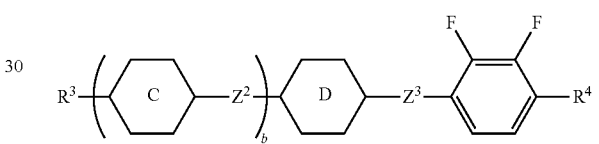

wherein, in formula (1) and formula (2), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $R^2$ is a group represented by —OH, —OR$^o$, —NH2, —NHR$^o$ or —N(R$^o$)$_2$, in which R$^o$ is alkyl having 1 to 5 carbons, and in the alkyl, at least one piece of —CH$_2$— may be replaced by —O—, and at least one piece of —CH$_2$CH$_2$— may be replaced by —CH=CH—, and in these groups, at least one hydrogen may be replaced by fluorine; $R^3$ and $R^4$ are independently alkyl having 1 to 12 carbons, alkoxy having 1 to 12 carbons, alkenyl having 2 to 12 carbons or alkenyloxy having 2 to 12 carbons; ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracen-2,6-diyl, and in the rings, at least one hydrogen may be replaced by fluorine or chlorine, alkyl having 1 to 12 carbons, alkoxy having 1 to 12 carbons, or alkyl having 1 to 12 carbons in which at least one hydrogen is replaced by fluorine or chlorine; ring C is 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 1,4-phenylene in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; Z$^2$ and Z$^3$ are independently a single bond, —CH$_2$CH$_2$—, —CH$_2$O—, —OCH$_2$—, —COO— or —OCO—; Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in these groups, at least one hydrogen may be replaced with fluorine; a is 0, 1, 2, 3 or 4; and b is 0 or 1.

DESCRIPTION OF EMBODIMENTS

The invention provides a liquid crystal composition that contains a polar compound having a polymerizable group, in which the polar compound has high compatibility with a liquid crystal compound. The invention further provides the liquid crystal composition that can achieve vertical alignment of liquid crystal molecules by action of a polymer formed from the polar compound. The invention further provides a liquid crystal composition satisfying at least one of characteristics such as high maximum temperature of a nematic phase, low minimum temperature of the nematic phase, small viscosity, suitable optical anisotropy, large negative dielectric anisotropy, large specific resistance, high stability to ultraviolet light and high stability to heat. The invention further provides a liquid crystal composition having a suitable balance regarding at least two of the characteristics. The invention further provides a liquid crystal display device including such a composition. The invention further provides an AM device having characteristics such as a short response time, a large voltage holding ratio, low threshold voltage, a large contrast ratio and a long service life.

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with the composition for the purpose of adjusting characteristics such as a temperature range of the nematic phase, viscosity and dielectric anisotropy. The compound has a six-membered ring such as 1,4-cyclohexylene or 1,4-phenylene, and has rod-like molecular structure. "Polymerizable compound" is a compound to be added for the purpose of forming a polymer in the composition.

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added to the liquid crystal composition when necessary. The liquid crystal compound and the additive are mixed in such a procedure. A proportion (content) of the liquid crystal compounds is expressed in terms of weight percent (% by weight) based on the weight of the liquid crystal composition containing no additive, even when the additive has been added. A proportion (amount of addition) of the additive is expressed in terms of weight percent (% by weight) based on the weight of the liquid crystal composition containing no additive. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having a large specific resistance" means that the composition has a large specific resistance at room temperature and also at a temperature close to the maximum temperature in an initial stage, and the composition has the large specific resistance ratio at room temperature and also at a temperature close to the maximum temperature even after the device has been used for a long period of time. An expression "having a large voltage holding ratio" means that the device has a large voltage holding ratio at room temperature and also at a temperature close to the maximum temperature in an initial stage, and the device has the large voltage holding ratio at room temperature and also at a temperature close to the maximum temperature even after the device has been used for a long period of time. In the composition or the device, the characteristics may be occasionally examined before and after an aging test (including an acceleration deterioration test). An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as "compound (1)." At least one compound selected from the group of compounds represented by formula (2) may be occasionally abbreviated as "compound (2)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

An expression such as "at least one piece of —CH$_2$— may be replaced by —O—" is used herein. In the above case, —CH$_2$—CH$_2$—CH$_2$— may be converted into —O—CH$_2$—O— by replacement of non-adjacent —CH$_2$— by —O—. However, a case where —CH$_2$— adjacent to each other is replaced by —O— is excluded. The reason is that —O—O—CH$_2$— (peroxide) is formed in the above replacement. More specifically, the expression means both "one piece of —CH$_2$— may be replaced by —O—" and "at least two pieces of non-adjacent —CH$_2$— may be replaced by —O—." A same rule applies not only to replacement to —O— but also to replacement to a divalent group such as —CH=CH— or —COO—.

A symbol of terminal group R$^1$ is used in a plurality of compounds in chemical formulas of component compounds. In these compounds, two groups represented by two pieces of arbitrary R$^1$ may be identical or different. For example, in one case, R$^1$ of compound (1-1) is ethyl and R$^1$ of compound (1-2) is ethyl. In another case, R$^1$ of compound (1-1) is ethyl and R$^1$ of compound (1-2) is propyl. A same rule applies also to a symbol of any other terminal group or the like. In formula (1), when a is 2, two pieces of ring A exist. In the compound, two groups represented by two of ring A may be identical or different. A same rule applies also to two of arbitrary ring A when a is larger than 2. A same rule applies also to any other symbol. A same rule applies also to such a case where two pieces of -Sp$^4$-P$^2$ exists in compound (5-27).

Symbol A, B, C, D or the like surrounded by a hexagonal shape corresponds to ring A, ring B, ring C and ring D, respectively, and represents a six-membered ring, a fused ring or the like. An oblique line crossing the hexagonal shape represents that arbitrary hydrogen on the ring may be replaced by -Sp$^3$-P$^1$ group or the like. A subscript such as 'j' represents the number of groups to be replaced. When the subscript 'j' is 0, no such replacement exists. When the subscript 'j' is 2 or more, a plurality of pieces of -Sp$^3$-P$^1$ exist on ring J. The plurality of groups represented by -Sp$^3$-P$^1$ may be identical or different.

Then, 2-fluoro-1,4-phenylene means two divalent groups described below. In a chemical formula, fluorine may be leftward (L) or rightward (R). A same rule applies also to an asymmetrical divalent group formed by removing two hydrogens from a ring, such as tetrahydropyran-2,5-diyl. A same rule applies also to a divalent bonding group such as carbonyloxy (—COO— or —OCO—).

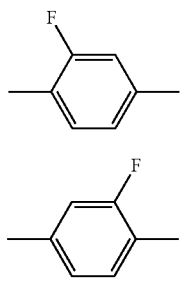

Alkyl of the liquid crystal compound is straight-chain alkyl or branched-chain alkyl, and includes no cyclic alkyl. Straight-chain alkyl is preferred to branched-chain alkyl. A same rule applies also to a terminal group such as alkoxy and alkenyl. With regard to a configuration of 1,4-cyclohexylene, trans is generally preferred to cis. Halogen means fluorine, chlorine, bromine and iodine. Preferred halogen is fluorine or chlorine. Further preferred halogen is fluorine.

The invention includes items described below.

Item 1. A liquid crystal composition that has negative dielectric anisotropy, and contains at least one compound selected from the group of polar compounds represented by formula (1) as a first additive and at least one compound selected from the group of compounds represented by formula (2) as a first component:

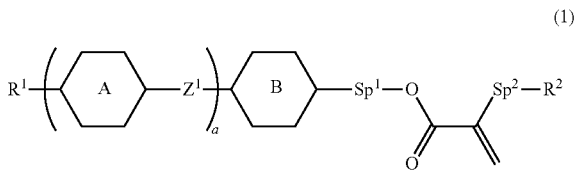

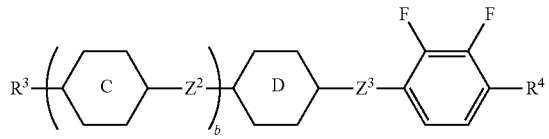

wherein, in formula (1) and formula (2), R$^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; R$^2$ is a group represented by —OH, —OR$^0$, —NH$_2$, —NHR$^0$ or —N(R$^0$)$_2$, in which R$^0$ is alkyl having 1 to 5 carbons, and in the alkyl, at least one piece of —CH$_2$— may be replaced by —O—, and at least one piece of —CH$_2$CH$_2$— may be replaced by —CH=CH—, and in these groups, at least one hydrogen may be replaced by fluorine; R$^3$ and R$^4$ are independently alkyl having 1 to 12 carbons, alkoxy having 1 to 12 carbons, alkenyl having 2 to 12 carbons or alkenyloxy having 2 to 12 carbons; ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracen-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring C is 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 1,4-phenylene in which at least one hydrogen is replaced by fluorine or chlorine; Z$^1$ is a single bond, —CH$_2$CH$_2$—, —CH=CH—, —COO—, —OCO—, —CF$_2$O—, —OCF$_2$—, —CH$_2$O—, —OCH$_2$— or —CF=CF—; Z$^2$ and Z$^3$ are independently a single bond, —CH$_2$CH$_2$—, —CH$_2$O—, —OCH$_2$—, —COO— or —OCO—; Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in these groups, at least one hydrogen may be replaced by fluorine; a is 0, 1, 2, 3 or 4; and b is 0 or 1.

Item 2. The liquid crystal composition according to item 1, wherein the first additive is at least one compound selected from the group of polar compounds represented by formula (1-1) to formula (1-9):

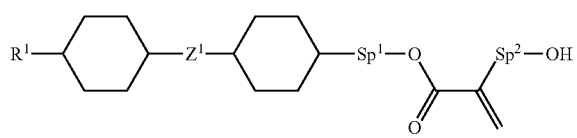

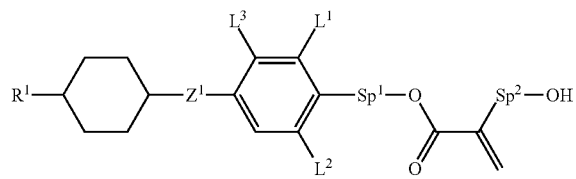
(1-2)

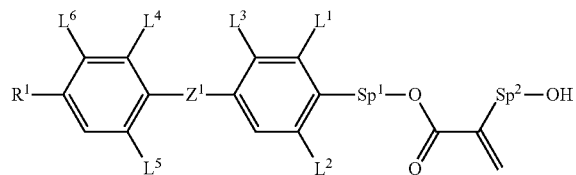
(1-3)

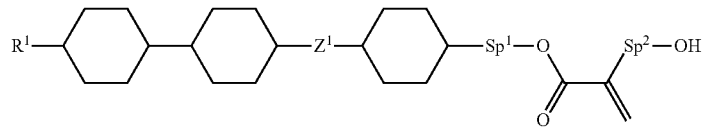
(1-4)

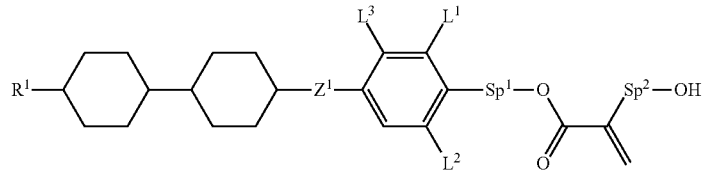
(1-5)

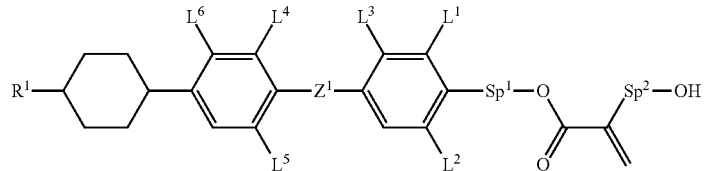
(1-6)

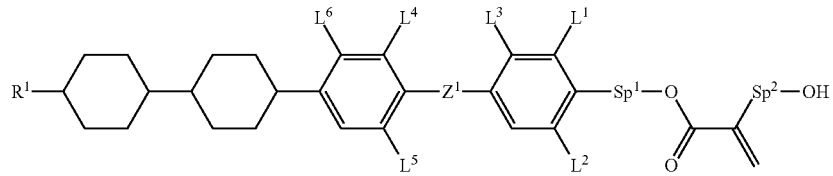
(1-7)

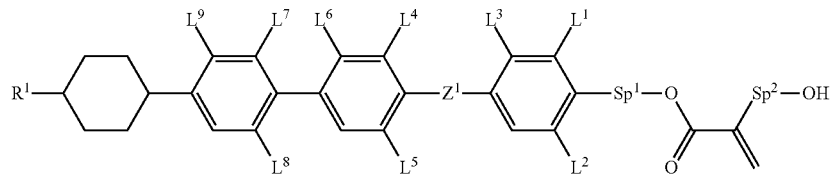
(1-8)

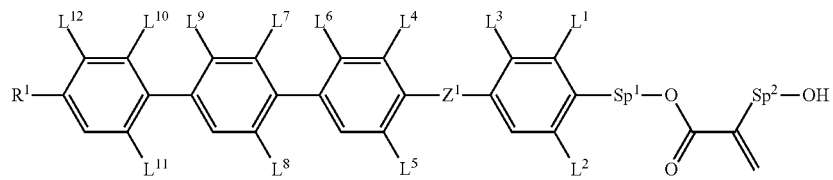
(1-9)

wherein, in formula (1-1) to formula (1-9), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in these groups, at least one hydrogen may be replaced by fluorine; and $L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl.

Item 3. The liquid crystal composition according to item 1 or 2, containing at least one compound selected from the group of compounds represented by formula (2-1) to formula (2-6) as the first component:

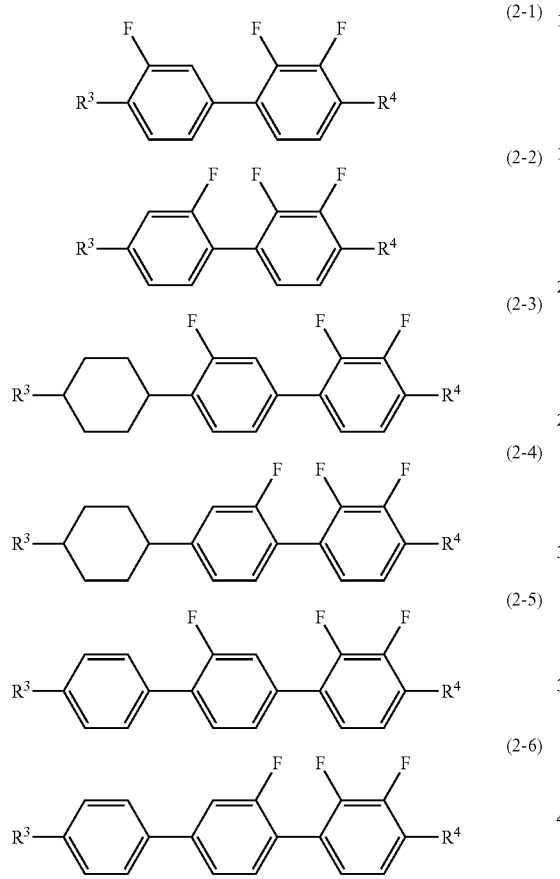

wherein, in formula (2-1) to formula (2-6), $R^3$ and $R^4$ are independently alkyl having 1 to 12 carbons, alkoxy having 1 to 12 carbons, alkenyl having 2 to 12 carbons or alkenyloxy having 2 to 12 carbons.

Item 4. The liquid crystal composition according to any one of items 1 to 3, wherein a proportion of the first additive is in the range from 0.05% by weight to 10% by weight, and a proportion of the first component is in the range from 5% by weight to 50% by weight, based on the weight of the liquid crystal composition.

Item 5. The liquid crystal composition according to any one of items 1 to 4, containing at least one compound selected from the group of compounds represented by formula (3) as a second component:

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, —$CH_2CH_2$—, —$CH_2O$—, —$OCH_2$—, —COO— or —OCO—; and c is 1, 2 or 3.

Item 6. The liquid crystal composition according to any one of items 1 to 5, containing at least one compound selected from the group of compounds represented by formula (3-1) to formula (3-13) as the second component:

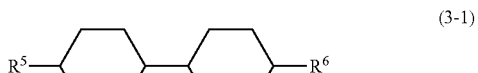

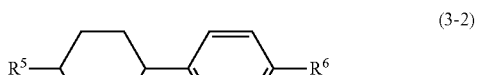

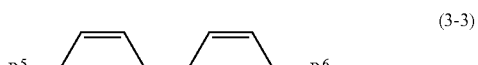

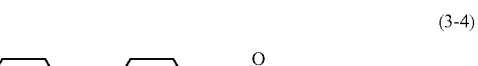

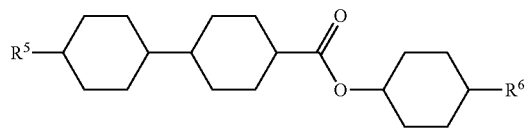

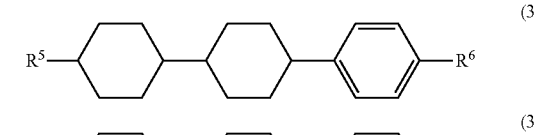

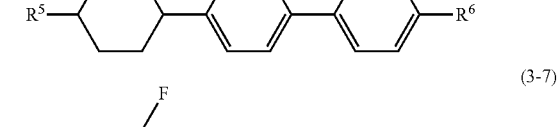

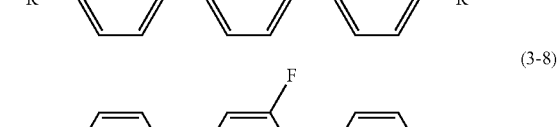

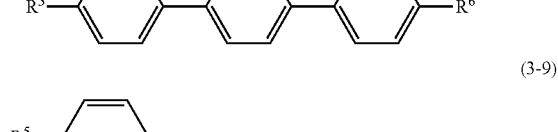

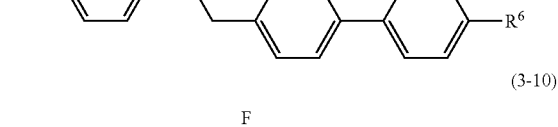

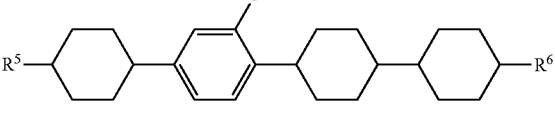

(3-11)

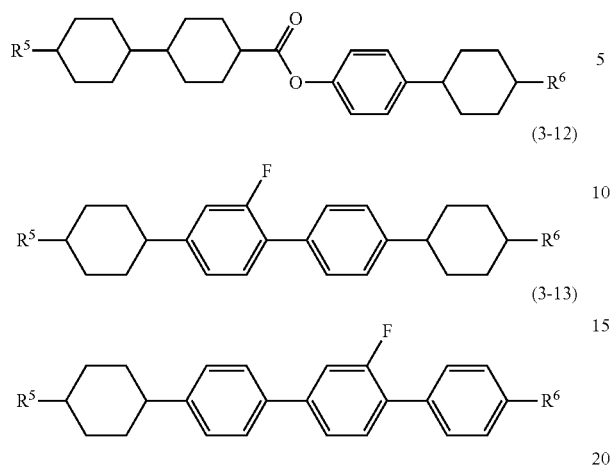

(3-12)

(3-13)

wherein, in formula (3-1) to formula (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

Item 7. The liquid crystal composition according to item 5 or 6, wherein a proportion of the second component is in the range from 10% by weight to 70% by weight based on the weight of the liquid crystal composition.

Item 8. The liquid crystal composition according to any one of items 1 to 7, containing at least one compound selected from the group of compounds represented by formula (4) as a third component:

(4)

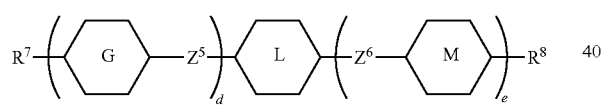

wherein, in formula (4), $R^7$ and $R^8$ are independently alkyl having 1 to 12 carbons, alkoxy having 1 to 12 carbons, alkenyl having 2 to 12 carbons or alkenyloxy having 2 to 12 carbons; ring G and ring M are independently 1,4-cyclohexylene, 1,4-cyclohexenylene, 1,4-phenylene or tetrahydropyran-2,5-diyl; ring L is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, —CH₂CH₂—, —CH₂O—, —OCH₂—, —COO— or —OCO—; and d is 1, 2 or 3, e is 0 or 1, and a sum of d and e is 3 or less.

Item 9. The liquid crystal composition according to any one of items 1 to 8, containing at least one compound selected from the group of compounds represented by formula (4-1) to formula (4-17) as the third component:

(4-1)

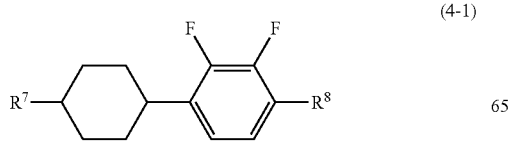

(4-2)

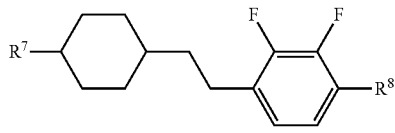

(4-3)

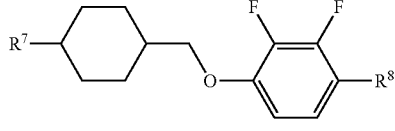

(4-4)

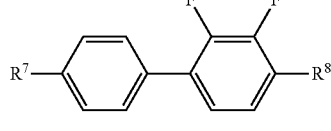

(4-5)

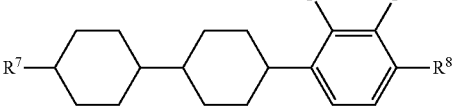

(4-6)

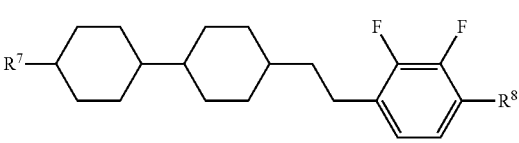

(4-7)

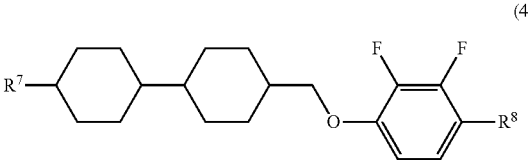

(4-8)

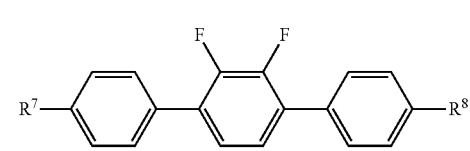

(4-9)

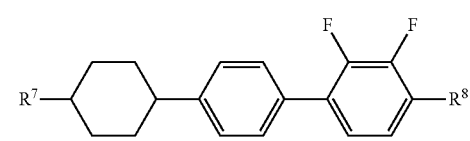

(4-10)

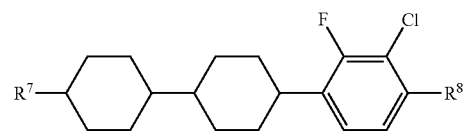

(4-11)

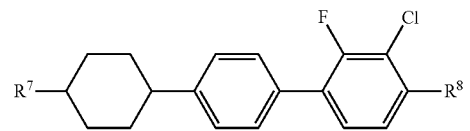

(4-12)

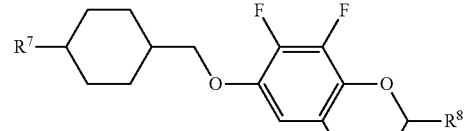

-continued

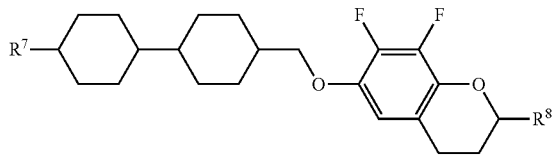
(4-13)

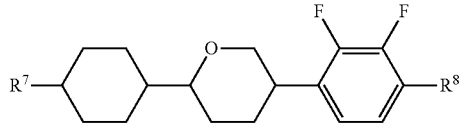
(4-14)

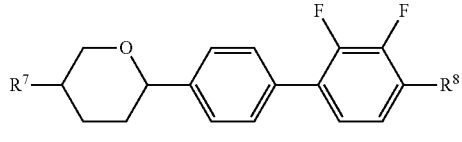
(4-15)

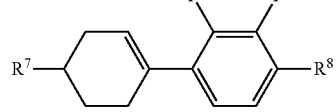
(4-16)

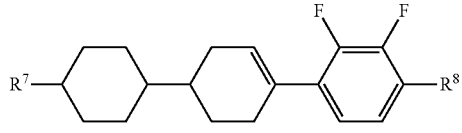
(4-17)

wherein, in formula (4-1) to formula (4-17), $R^7$ and $R^8$ are independently alkyl having 1 to 12 carbons, alkoxy having 1 to 12 carbons, alkenyl having 2 to 12 carbons or alkenyloxy having 2 to 12 carbons.

Item 10. The liquid crystal composition according to item 8 or 9, wherein a proportion of the third component is in the range from 5% by weight to 75% by weight based on the weight of the liquid crystal composition.

Item 11. The liquid crystal composition according to any one of items 1 to 10, containing at least one compound selected from the group of polymerizable compounds represented by formula (5) as a second additive:

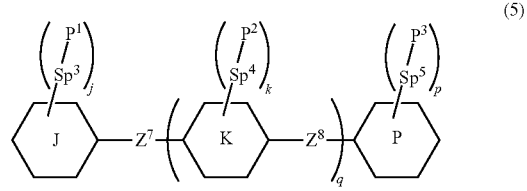
(5)

wherein, in formula (5), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen may be replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^7$ and $Z^8$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C($CH_3$)=CH—, —CH=C($CH_3$)— or —C($CH_3$)=C($CH_3$)—, and in these groups, at least one hydrogen may be replaced by fluorine or chlorine; $P^1$, $P^2$ and $P^3$ are a polymerizable group; $Sp^3$, $Sp^4$ and $Sp^5$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in these groups, at least one hydrogen may be replaced by fluorine or chlorine; q is 0, 1 or 2; and j, k and p are independently 0, 1, 2, 3 or 4, and a sum of j, k and p is 1 or more.

Item 12. The liquid crystal composition according to item 11, wherein, in formula (5), $P^1$, $P^2$ and $P^3$ are independently a polymerizable group selected from the group of groups represented by formula (P-1) to formula (P-5):

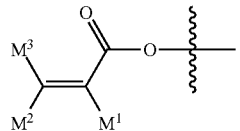
(P-1)

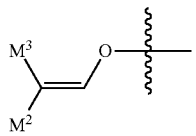
(P-2)

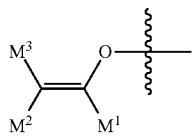
(P-3)

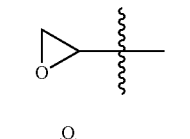
(P-4)

(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 13. The liquid crystal composition according to any one of items 1 to 12, wherein the second additive is at least one compound selected from the group of polymerizable compounds represented by formula (5-1) to formula (5-28):

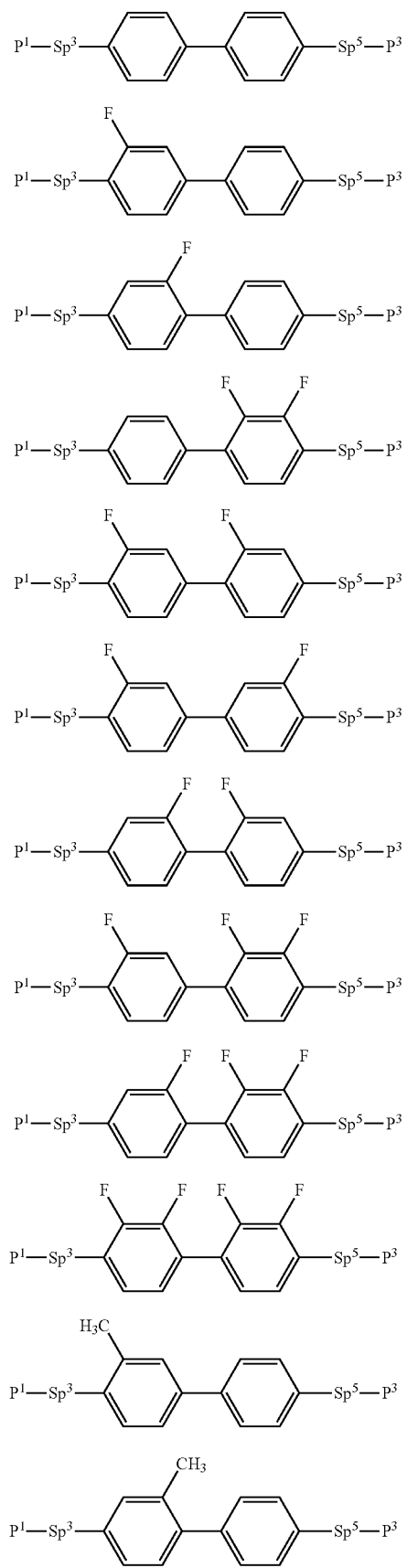
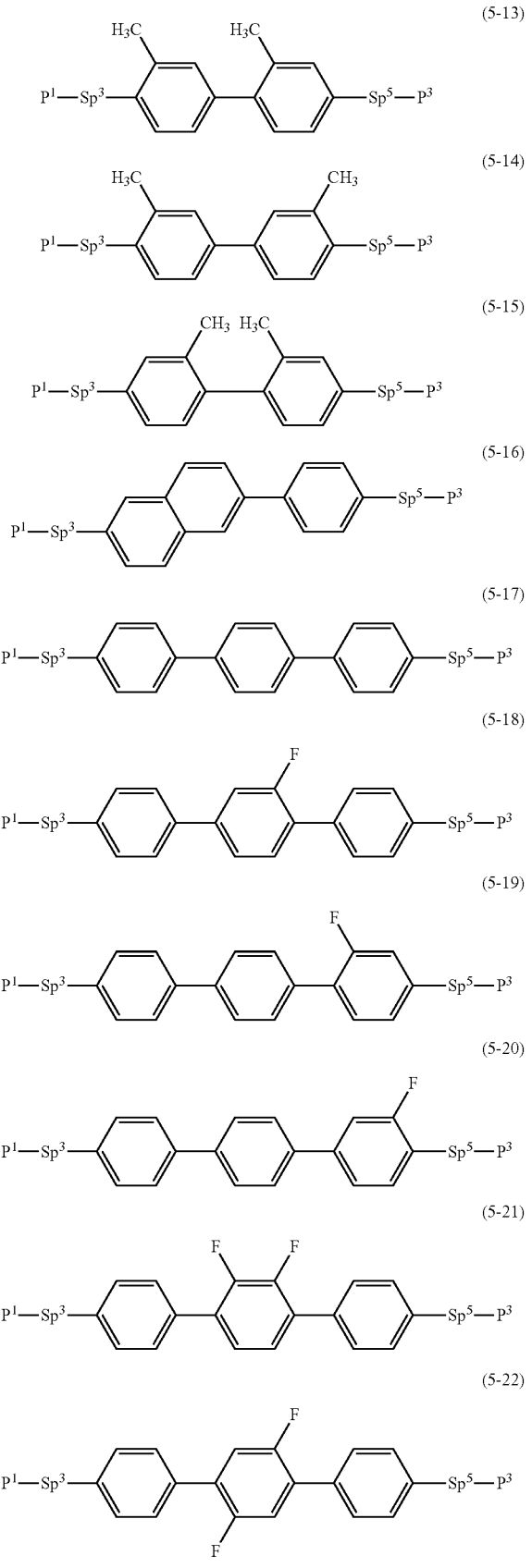

(5-23)
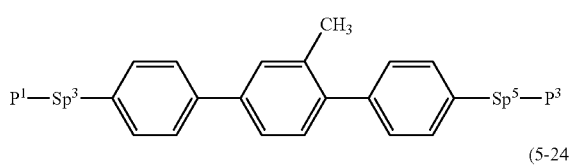

(5-24)
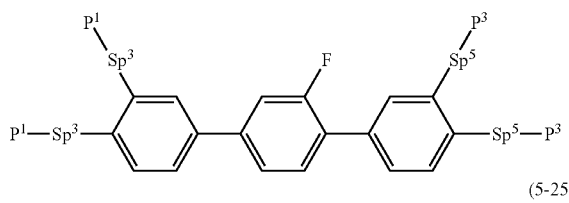

(5-25)
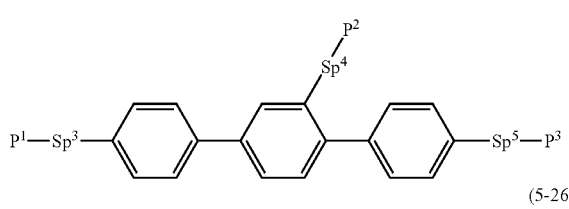

(5-26)
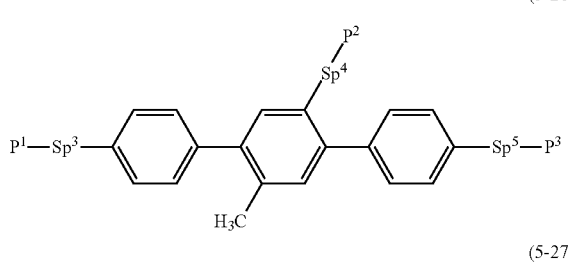

(5-27)
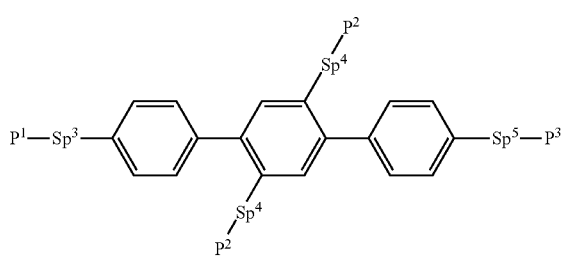

(5-28)
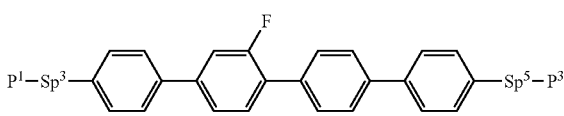

wherein, in formula (5-1) to formula (5-28), $P^1$, $P^2$ and $P^3$ are independently a polymerizable group selected from the group of groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine; and (P-1)
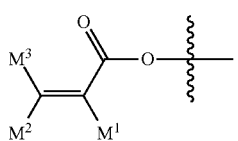

(P-2)
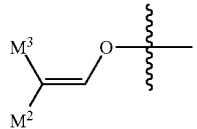

(P-3)
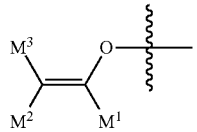

wherein, $Sp^3$, $Sp^4$ and $Sp^5$ are independently a single bond or alkylene having 1 to 10 carbons, and in the alkylene, at least one piece of —CH$_2$— may be replaced by —O—, —OCO—, —OCO— or —OCOO—, and at least one piece of —CH$_2$CH$_2$— may be replaced by —CH=CH— or and in these groups, at least one hydrogen may be replaced by fluorine or chlorine.

Item 14. The liquid crystal composition according to any one of items 11 to 13, wherein a proportion of the second additive is in the range from 0.03% by weight to 10% by weight based on the weight of the liquid crystal composition.

Item 15. A liquid crystal display device, including the liquid crystal composition according to any one of items 1 to 14.

Item 16. The liquid crystal display device according to item 15, wherein an operating mode in the liquid crystal display device is an IPS mode, a VA mode, an FFS mode or an FPA mode, and a driving mode in the liquid crystal display device is an active matrix mode.

Item 17. A polymer sustained alignment mode liquid crystal display device, wherein the liquid crystal display device includes the liquid crystal composition according to any one of items 1 to 14, and the first additive in the liquid crystal composition is polymerized, or the first additive and the second additive therein are polymerized.

Item 18. A liquid crystal display device having no alignment film, wherein the liquid crystal display device includes the liquid crystal composition according to any one of items 1 to 14, and the first additive in the liquid crystal composition is polymerized, or the first additive and the second additive therein are polymerized.

Item 19. Use of the liquid crystal composition according to any one of items 1 to 14 in a liquid crystal display device.

Item 20. Use of the liquid crystal composition according to any one of items 1 to 14 in a polymer sustained alignment mode liquid crystal display device.

Item 21. Use of the liquid crystal composition according to any one of items 1 to 14 in a liquid crystal display device having no alignment film.

The invention further includes the following items: (a) a method of producing the liquid crystal display device by arranging the liquid crystal composition between two substrates, irradiating the composition with light while applying voltage to the composition, and polymerizing a polar compound that has a polymerizable group and is contained in the composition; and (b) the liquid crystal composition, wherein a maximum temperature of a nematic phase is 70° C. or higher, optical anisotropy (measured at 25° C.) at a wavelength of 589 nanometers is 0.08 or more and dielectric anisotropy (measured at 25° C.) at a frequency of 1 kHz is −2 or less.

The invention further includes the following items: (c) the composition, containing at least one compound selected from the group of compounds in which the compounds are compound (5) to compound (7) described in JP 2006-199941 A, and are a liquid crystal compound having positive dielectric anisotropy; (d) the composition, containing at least two of the polar compounds described above; (e) the composition, further containing a polar compound different from the polar compound described above; (f) the composition, containing one, two or at least three additives, such as an optically active compound, an antioxidant, an ultraviolet light absorber, a dye, an antifoaming agent, a polymerizable compound, a polymerization initiator, a polymerization inhibitor and the polar compound, in which the additive may be identical or different from the first additive or the second additive; (g) an AM device including the composition; (h) a device including the composition, and having a TN, ECB, OCB, IPS, FFS, VA or FPA mode; (i) a transmissive device including the composition; (j) use of the composition as the composition having the nematic phase; and (k) use as an optically active composition by adding the optically active compound to the composition.

The composition of the invention will be described in the following order. First, a constitution of the composition will be described. Second, main characteristics of the component compounds and main effects of the compounds on the composition will be described. Third, the combination of components in the composition, the preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the composition will be described. The composition of the invention is classified into composition A and composition B. Composition A may further contain any other liquid crystal compound, an additive or the like in addition to the liquid crystal compound selected from compound (2), compound (3) and compound (4). "Any other liquid crystal compound" means a liquid crystal compound different from compound (2), compound (3) and compound (4). Such a compound is mixed with the composition for the purpose of further adjusting the characteristics. The additive is the optically active compound, the antioxidant, the ultraviolet light absorber, the dye, the antifoaming agent, the polymerizable compound, the polymerization initiator, the polymerization inhibitor, the polar compound or the like.

Composition B consists essentially of the liquid crystal compound selected from compound (2), compound (3) and compound (4). An expression "essentially" means that the composition B may contain the additive, but contains no any other liquid crystal compound. Composition B has a smaller number of components than composition A has. Composition B is preferred to composition A from a viewpoint of cost reduction. Composition A is preferred to composition B from a viewpoint of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and symbol 0 (zero) means that a value is zero or close to zero.

TABLE 2

| Characteristics of compounds | | | |
|---|---|---|---|
| | Compounds | | |
| | Compound (2) | Compound (3) | Compound (4) |
| Maximum temperature | S to M | S to L | S to L |
| Viscosity | L | S to M | M to L |
| Optical anisotropy | L | S to L | M to L |
| Dielectric anisotropy | L[1] | 0 | M to L[1] |
| Specific resistance | L | L | L |

[1] A compound having negative dielectric anisotropy

Upon mixing the component compounds with the composition, the main effects of the component compounds on the characteristics of the composition are as described below. Compound (1) is adsorbed to a substrate surface by action of the polar group, and controls alignment of liquid crystal molecules. In order to obtain an expected effect, compound (1) essentially needs to have high compatibility with the liquid crystal compound. Compound (1) has a six-membered ring such as 1,4-cyclohexylene or 1,4-phenylene, and has rod-like molecular structure, and therefore is most suitable for the purpose. Compound (1) gives a polymer by polymerization. The polymer stabilizes the alignment of the liquid crystal molecules, and therefore shortens a response time of the device and improves image persistence. Compound (2) increases the dielectric anisotropy, and increases the optical anisotropy. Compound (3) decreases the viscosity, increases the maximum temperature or decreases the minimum temperature. Compound (4) increases the dielectric anisotropy and decreases the minimum temperature. Compound (5) gives a polymer by polymerization. The polymer stabilizes the alignment of the liquid crystal molecules, and therefore shortens a response time of the device and improves image persistence. From a viewpoint of alignment of liquid crystal molecules, the polymer of compound (1) has interaction with the substrate surface, and therefore can be presumed to be more effective than the polymer of compound (5).

Third, the combination of components in the composition, the preferred proportion of the components and the basis thereof will be described. Preferred combinations of components in the composition include a combination of compound (1), compound (2) and compound (3), a combination of compound (1), compound (2), compound (3) and compound (4), or a combination of compound (1), compound (2), compound (3), compound (4) and compound (5).

Compound (1) is added to the composition for the purpose of controlling the alignment of the liquid crystal molecules. A preferred proportion of compound (1) is about 0.05% by weight or more for aligning the liquid crystal molecules, and about 10% by weight or less for preventing poor display of the device, based on the weight of the liquid crystal composition. A further preferred proportion is in the range from about 0.1% by weight to about 7% by weight. A particularly preferred proportion is in the range from about 0.5% by weight to about 5% by weight.

A preferred proportion of compound (2) is about 5% by weight or more for increasing the dielectric anisotropy, and about 50% by weight or less for decreasing the viscosity. A further preferred proportion is in the range from about 10% by weight to about 45% by weight. A particularly preferred proportion is in the range from about 15% by weight to about 40% by weight.

A preferred proportion of compound (3) is about 10% by weight or more for increasing the maximum temperature or for decreasing the minimum temperature, and about 70% by weight or less for increasing the dielectric anisotropy. A further preferred proportion is in the range from about 15% by weight to about 65% by weight. A particularly preferred proportion is in the range from about 20% by weight to about 60% by weight.

A preferred proportion of compound (4) is about 5% by weight for increasing the dielectric anisotropy, and about 75% by weight or less for decreasing the minimum temperature. A further preferred proportion is in the range from about 10% by weight to about 45% by weight. A particularly preferred proportion is in the range from about 15% by weight to about 40% by weight.

A preferred proportion of compound (5) is about 0.03% by weight or more for improving long-term reliability of the device, and about 10% by weight or less for preventing poor display of the device. A further preferred proportion is in the range from about 0.1% by weight to about 2% by weight. A particularly preferred proportion is in the range from about 0.2% by weight to about 1.0% by weight.

Fourth, the preferred embodiment of the component compounds will be described. In formula (1), $R^2$ is a polar group. Compound (1) is added to the composition, and therefore is preferably stable. When compound (1) is added to the composition, the compound preferably does not decrease the voltage holding ratio of the device. Compound (1) preferably has low volatility. Preferred molar mass is 130 g/mol or more. Further preferred molar mass is in the range from 150 g/mol to 500 g/mol.

$R^2$ is a group represented by —OH, —OR$^0$, —NH$_2$, —NHR$^0$ or —N(R$^0$)$_2$, in which R$^0$ is alkyl having 1 to 5 carbons, and in the alkyl, at least one piece of —CH$_2$— may be replaced by —O—, and at least one piece of —CH$_2$CH$_2$— may be replaced by —CH═CH—, and in these groups, at least one hydrogen may be replaced by fluorine. From a viewpoint of high solubility in the liquid crystal composition, $R^2$ is particularly preferably —OH or —NH$_2$. Then, —OH has high anchor force, and therefore is further preferred to —O—, —CO— or —COO—. A group containing a plurality of hetero atoms (nitrogen, oxygen) is particularly preferred. A compound having such a polar group is effective even at a low concentration.

$R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^1$ is alkyl having 1 to 12 carbons.

Ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracen-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring A or ring B is 1,4-cyclohexylene, 1,4-phenylen or 2-fluoro-1,4-phenylene.

$Z^1$ is a single bond, —CH$_2$CH$_2$—, —CH═CH—, —C≡C—, —COO—, —OCO—, —CF$_2$O—, —OCF$_2$—, —CH$_2$O—, —OCH$_2$— or —CF═CF—. Preferred $Z^1$ is a single bond, —CH$_2$CH$_2$—, —CH$_2$O—, —OCH$_2$—, —COO— or —OCO—. Further preferred $Z^1$ is a single bond.

Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH═CH—, and in these groups, at least one hydrogen may be replaced by fluorine. Preferred Sp$^1$ or Sp$^2$ is a single bond.

Then, a is 0, 1, 2, 3 or 4. Preferred a is 0, 1 or 2.

In formula (1-1) to formula (1-9), $L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl. Preferred $L^1$ to $L^{12}$ are hydrogen, fluorine or methyl. Further preferred $L^1$ to $L^{12}$ are hydrogen or fluorine.

In formula (2), formula (3) and formula (4), $R^3$, $R^4$, $R^7$ and $R^8$ are independently alkyl having 1 to 12 carbons, alkoxy having 1 to 12 carbons, alkenyl having 2 to 12 carbons or alkenyloxy having 2 to 12 carbons. Preferred $R^3$, $R^4$, $R^7$ or $R^8$ is alkyl having 1 to 12 carbons for increasing stability to ultraviolet light or heat, and alkoxy having 1 to 12 carbons for increasing the dielectric anisotropy. $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^5$ or $R^6$ is alkenyl having 2 to 12 carbons for decreasing the viscosity, and alkyl having 1 to 12 carbons for increasing the stability to ultraviolet light or heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. For decreasing the viscosity, and so forth, in alkenyl such as 1-propenyl, 1-butenyl, 1-pentenyl, 1-hexenyl, 3-pentenyl and 3-hexenyl, trans is preferred. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Preferred examples of alkyl in which at least one hydrogen is replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples are 2-fluoroethyl, 3-fluoropropyl, 4-fluorobutyl or 5-fluoropentyl for increasing the dielectric anisotropy.

Preferred examples of alkenyl in which at least one hydrogen is replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples are 2,2-difluorovinyl or 4,4-difluoro-3-butenyl for decreasing the viscosity.

Ring C is 1,4-cycloxylene, 1,4-cyclohexenylene, 1,4-phenylene, 1,4-phenylene in which at least one hydrogen is replaced by fluorine or chlorine, or tetrahydropyran-2,5-diyl. Preferred examples of "1,4-phenylene in which at least one hydrogen is replaced by fluorine or chlorine" are 2-fluoro-1,4-phenylene, 2,3-difluoro-1,4-phenylene or 2-chloro-3-fluoro-1,4-phenylene. Preferred ring C is 1,4-cyclohexylene for decreasing the viscosity, tetrahydropyran-2,5-diyl for increasing the dielectric anisotropy, and 1,4-phenylene for increasing the optical anisotropy. Ring D is 1,4-phenylene in which at least one hydrogen is replaced by fluorine or chlorine. With regard to a configuration of 1,4-cyclohexylene, trans is preferred to cis for increasing the maximum temperature. Tetrahydropyran-2,5-diyl includes:

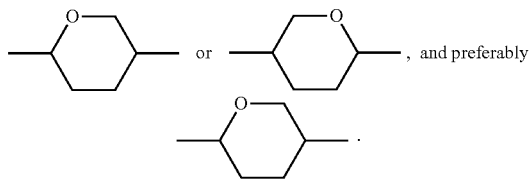

, and preferably

Ring E and ring F are independently 1,4-cyclohexylene, 1,4-phenylene, 2-fluoro-1,4-phenylene or 2,5-difluoro-1,4-phenylene. Preferred ring E or ring G is 1,4-cyclohexylene for decreasing the viscosity or for increasing the maximum temperature, and 1,4-phenylene for decreasing the minimum temperature. With regard to a configuration of 1,4-cyclohexylene, trans is preferred to cis for increasing the maximum temperature.

Ring G and ring M are independently 1,4-cyclohexylene, 1,4-cyclohexenylene, 1,4-phenylene or tetrahydropyran-2,5-diyl. Preferred ring G or ring M is 1,4-cyclohexylene for decreasing the viscosity, tetrahydropyran-2,5-diyl for increasing the dielectric anisotropy, and 1,4-phenylene for increasing the optical anisotropy.

Ring L is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring L is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy.

$Z^2$, $Z^3$, $Z^5$ and $Z^6$ are independently a single bond, —CH$_2$CH$_2$—, —CH$_2$O—, —OCH$_2$—, —COO— or —OCO—. Preferred $Z^2$, $Z^3$, $Z^5$ or $Z^6$ is a single bond for decreasing the viscosity, —CH$_2$CH$_2$— for decreasing the minimum temperature, and —CH$_2$O— or —OCH$_2$— for increasing the dielectric anisotropy. $Z^4$ is a single bond, —CH$_2$CH$_2$—, —CH$_2$O—, —OCH$_2$—, —COO— or —OCO—. Preferred $Z^4$ is a single bond for decreasing the viscosity, —CH$_2$CH$_2$— for decreasing the minimum temperature, and —COO— or —OCO— for increasing the maximum temperature.

Then, b is 0 or 1. Preferred b is 0 for decreasing the viscosity, and 1 for increasing the maximum temperature. Then, c is 1, 2 or 3. Preferred c is 1 for decreasing the viscosity, and 2 or 3 for increasing the maximum temperature. Then, d is 1, 2 or 3, e is 0 or 1, and a sum of d and e is 3 or less. Preferred d is 1 for decreasing the viscosity, and 2 or 3 for increasing the maximum temperature. Preferred e is 0 for decreasing the viscosity, and 1 for decreasing the minimum temperature.

In formula (5), $P^1$, $P^2$ and $P^3$ are independently a polymerizable group. Preferred $P^1$, $P^2$ or $P^3$ is a polymerizable group selected from the group of groups represented by formula (P-1) to formula (P-5). Further preferred $P^1$, $P^2$ or $P^3$ is a group represented by formula (P-1), formula (P-2) or formula (P-3). Particularly preferred $P^1$, $P^2$ or $P^3$ is a group represented by formula (P-1) or formula (P-2). Most Preferred $P^1$, $P^2$ or $P^3$ is a group represented by formula (P-1). A preferred group represented by formula (P-1) is —OCO—CH=CH$_2$ or —OCO—C(CH$_3$)=CH$_2$. A wavy line in formula (P-1) to formula (P-5) represents a site to fault a bonding.

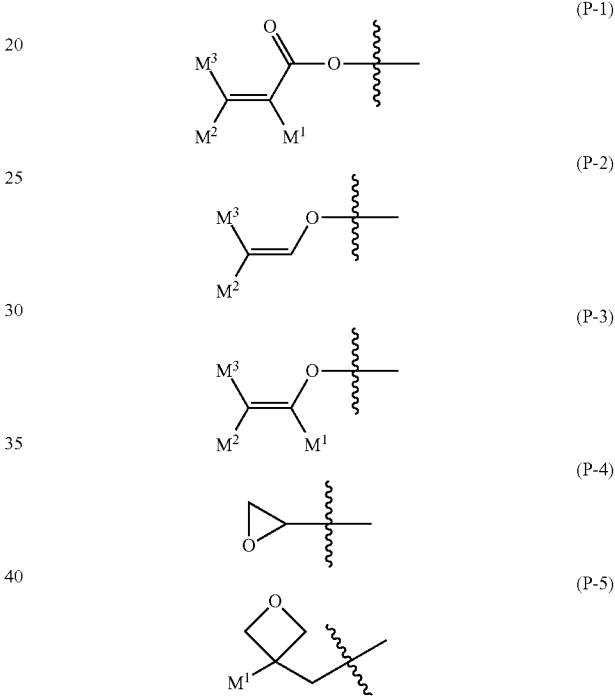

In formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^3$, $Sp^4$ and $Sp^5$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in these groups, at least one hydrogen may be replaced by fluorine or chlorine. Preferred $Sp^3$, $Sp^4$ or $Sp^5$ is a single bond, —CH$_2$CH$_2$—, —CH$_2$O—, —OCH$_2$—, —COO—, —OCO—, —CO—CH=CH— or —CH=CH—CO—. Further preferred $Sp^3$, $Sp^4$ or $Sp^5$ is a single bond.

Ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring J or ring P is phenyl. Ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring K is 1,4-phenylene or 2-fluoro-1,4-phenylene.

$Z^7$ and $Z^8$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C($CH_3$)=CH—, —CH=C($CH_3$)— or —C($CH_3$)=C($CH_3$)—, and in these groups, at least one hydrogen may be replaced by fluorine or chlorine. Preferred $Z^7$ or $Z^8$ is a single bond, —$CH_2CH_2$—, —$CH_2O$—, —$OCH_2$—, —COO— or —OCO—. Further preferred $Z^7$ or $Z^8$ is a single bond.

Then, q is 0, 1 or 2. Preferred q is 0 or 1. Then, j, k and p are independently 0, 1, 2, 3 or 4, and a sum of j, k and p is 1 or more. Preferred j, k or p is 1 or 2.

Fifth, the preferred component compound will be described. Preferred compound (1) includes compound (1-1) to compound (1-9) described in item 2. In these compounds, at least one of the first additives preferably includes compound (1-1), compound (1-2), compound (1-3), compound (1-5) or compound (1-6). At least two of the first additives preferably includes a combination of compound (1-1) and compound (1-2) or a combination of compound (1-1) and compound (1-4).

Preferred compound (2) includes compound (2-1) to compound (2-6) described in item 3. In these compounds, at least one of the first components preferably includes compound (2-1), compound (2-3) or compound (2-5). At least two of the first components preferably include a combination of compound (2-1) and compound (2-3) or a combination of compound (2-1) and compound (2-5).

Preferred compound (3) includes compound (3-1) to compound (3-13) described in item 6. In these compounds, at least one of the second components preferably includes compound (3-1), compound (3-3), compound (3-5), compound (3-6), compound (3-8) or compound (3-9). At least two of the second components preferably include a combination of compound (3-1) and compound (3-3), a combination of compound (3-1) and compound (3-5) or a combination of compound (3-1) and compound (3-6).

Preferred compound (4) includes compound (4-1) to compound (4-17) described in item 9. In these compounds, at least one of the first component preferably includes compound (4-1), compound (4-3), compound (4-4), compound (4-5), compound (4-7) or compound (4-9). At least two of the first components preferably include a combination of compound (4-1) and compound (4-5), a combination of compound (4-1) and compound (4-9), a combination of compound (4-3) and compound (4-5), a combination of compound (4-3) and compound (4-9), a combination of compound (4-4) and compound (4-5) or a combination of compound (4-4) and compound (4-7).

Preferred compound (5) includes compound (5-1) to compound (5-28) described in item 13. In these compounds, at least one of the second additives preferably includes compound (5-1), compound (5-2), compound (5-24), compound (5-25), compound (5-26) or compound (5-27). At least two of the second additives preferably include a combination of compound (5-1) and compound (5-2), a combination of compound (5-1) and compound (5-18), a combination of compound (5-2) and compound (5-24), a combination of compound (5-2) and compound (5-25), a combination of compound (5-2) and compound (5-26), a combination of compound (5-25) and compound (5-26) or a combination of compound (5-18) and compound (5-24).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor and the polar compound. The optically active compound is added to the composition for the purpose of inducing a helical structure in liquid crystal molecules to give a twist angle. Examples of such a compound include compound (6-1) to compound (6-5). A preferred proportion of the optically active compound is about 5% by weight or less. A further preferred proportion is in the range from about 0.01% by weight to about 2% by weight.

(6-1)

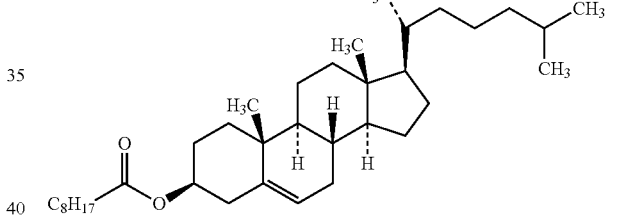

(6-2)

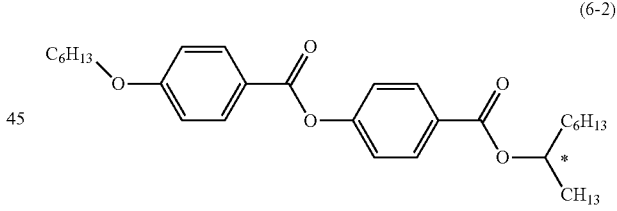

(6-3)

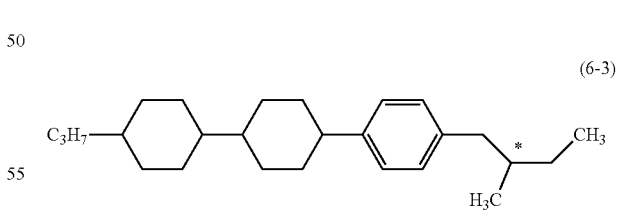

(6-4)

-continued (6-5)

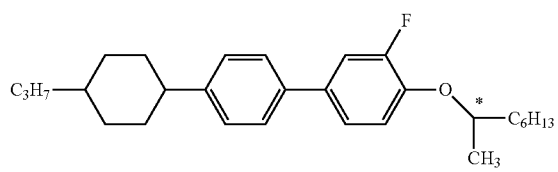

The antioxidant is added to the composition for preventing a decrease in the specific resistance caused by heating in air, or for maintaining a large voltage holding ratio at room temperature and also at the temperature close to the maximum temperature even after the device has been used for a long period of time. Preferred examples of an antioxidant include compound (7) where n is an integer from 1 to 9.

(7)

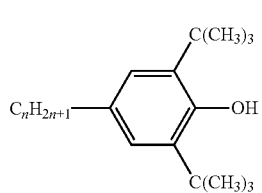

In compound (7), preferred n is 1, 3, 5, 7 or 9. Further preferred n is 7. Compound (7) where n is 7 has small volatility, and therefore is effective in maintaining a large voltage holding ratio at room temperature and also at a temperature close to the maximum temperature even after the device has been used for a long period of time. A preferred proportion of the antioxidant is about 50 ppm or more for achieving an effect thereof, and about 600 ppm or less for avoiding a decrease in the maximum temperature or an increase in the minimum temperature. A further preferred proportion is in the range from about 100 ppm to about 300 ppm.

Preferred examples of an ultraviolet light absorber are a benzophenone derivative, a benzoate derivative, a triazole derivative or the like. A light stabilizer such as an amine having steric hindrance is also preferred. A preferred proportion of the absorber or the stabilizer is about 50 ppm or more for achieving an effect thereof, and about 10,000 ppm or less for avoiding a decrease in the maximum temperature or an increase in the minimum temperature. A further preferred proportion is in the range from about 100 ppm to about 10,000 ppm.

A dichroic dye such as an azo dye or an anthraquinone dye is added to the composition to be adapted for a device having a guest host (GH) mode. A preferred proportion of the dye is in the range from about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range from about 1 ppm to about 500 ppm.

The polymerizable compound is used to be adapted for a polymer sustained alignment (PSA) mode device. Compound (1) and compound (5) are suitable for the above purpose. Any other polymerizable compound that is different from compound (1) and compound (5) may be added to the composition together with compound (1) and compound (5). Preferred examples of any other polymerizable compounds include acrylate, methacrylate, a vinyl compound, a vinyloxy compound, propenyl ether, an epoxy compound (oxirane, oxetane) and a compound such as vinyl ketone. Further preferred examples include acrylate or methacrylate. A preferred total proportion of compound (1) and compound (5) is about 10% by weight or more based on the total weight of the polymerizable compound. A further preferred total proportion thereof is about 50% by weight or more. A particularly preferred total proportion thereof is about 80% by weight or more. A particularly preferred total proportion thereof is also 100% by weight. Reactivity of a polymerizable compound and a pretilt angle of a liquid crystal molecule can be adjusted by changing a kind of compound (1) and compound (5), or by combining any other polymerizable compounds with compound (1) and compound (5) at a suitable ratio. The short response time of the device can be achieved by optimizing the pretilt angle. Alignment of the liquid crystal molecules is stabilized, and therefore a large contrast ratio and a long service life can be achieved.

The polymerizable compound is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range from about 0.1% by weight to about 5% by weight based on the total weight of the polymerizable compound. A further preferred proportion is in the range from about 1% by weight to about 3% by weight.

Upon storing the polymerizable compound, the polymerization inhibitor may be added thereto for preventing polymerization. The polymerizable compound is ordinarily added to the composition without removing the polymerization inhibitor. Examples of the polymerization inhibitor include hydroquinone, a hydroquinone derivative such as methylhydroquinone, 4-t-butylcatechol, 4-methoxyphenol and phenothiazine.

The polar compound is an organic compound having polarity. Here, a compound having an ionic bond is not included. An atom such as oxygen, sulfur and nitrogen is electrically more negative, and tends to have a partial negative charge. Carbon and hydrogen are neutral or tend to have a partial positive charge. The polarity is formed when the partial electric charge is not uniformly distributed between different kinds of atoms in the compound. For example, the polar compound has at least one of partial structures such as —OH, —COOH, —SH, —NH$_2$, >NH and >N—.

Seventh, the methods for synthesizing the component compounds will be described. The compounds can be prepared according to known methods. Examples of the synthetic methods are described. A synthesis method of compound (1) is described in the section of Example. Compound (2-1) is prepared by the method described in JP H9-52852 A. Compound (3-5) is prepared by the method described in JP S57-165328 A. Compound (4-1) is prepared by the method described in JP H2-503441 A. Compound (5-18) is prepared by the method described in JP H7-101900 A. Some of compound (7) are commercially available. A compound where n is 1 in formula (7) can be obtained from Aldrich (Sigma-Aldrich Corporation). Compounds (7) where n is 7 is prepared by the method described in U.S. Pat. No. 3,660,505 B.

Any compounds whose synthetic methods are not described above can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. Most of the composition has a minimum temperature of about −10° C. or lower, a maximum temperature of about 70° C. or higher, and optical anisotropy in the range from about 0.07 to about 0.20. The composition having optical anisotropy in the range from about 0.08 to about 0.25 may be prepared by controlling the proportion of the component compounds or by mixing any other liquid crystal compound. Further the composition having optical anisotropy in the range from about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used in the AM device. The composition can also be used in a PM device. The composition can also be used in an AM device and a PM device each having a mode such as the PC mode, the TN mode, the STN mode, the ECB mode, the OCB mode, the IPS mode, the FFS mode, the VA mode and the FPA mode. Use for the AM device having the TN mode, the OCB mode, the IPS mode or the FFS mode is particularly preferred. In the AM device having the IPS mode or the FFS mode, when no voltage is applied, the alignment of liquid crystal molecules may be parallel to a glass substrate, or may be perpendicular thereto. The above devices may be a reflective type, a transmissive type, or a transflective type. Use in the transmissive device is preferred. The composition can also be used in an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is famed in the composition.

One example of a conventional method of producing the polymer sustained alignment mode device is as described below. A device having two substrates referred to as an array substrate and a color filter substrate is assembled. The substrate has an alignment film. At least one of the substrates has an electrode layer. The liquid crystal compound is mixed to prepare a liquid crystal composition. A polymerizable compound is added to the composition. An additive may be further added thereto when necessary. The composition is injected into a device. The device is irradiated with light in a state in which voltage is applied thereto. Ultraviolet light is preferred. The polymerizable compound is polymerized by irradiation with the light. A composition containing a polymer is faulted by the polymerization. The polymer sustained alignment mode device is produced by such a procedure.

In the above procedure, when voltage is applied, liquid crystal molecules are aligned by action of the alignment film and an electric field. Molecules of the polymerizable compound are also aligned according to the above alignment. The polymerizable compound is polymerized by ultraviolet light in the above state, and therefore a polymer in which the alignment is maintained is formed. A response time in the device is shortened by an effect of the polymer. Image persistence is caused by poor operation of the liquid crystal molecule, and therefore is also simultaneously improved by the effect of the polymer. In addition, the polymerizable compound in the composition may be polymerized in advance, and the composition may be arranged between the substrates of the liquid crystal display device.

When compound (1), namely a polar compound having a polymerizable group is used as a polymerizable compound, the alignment film is unnecessary for the substrates of a device. A device having no alignment film is produced according to the procedure described in the two previous paragraphs.

In the above procedure, because a polar group interacts with a substrate surface, the polar compound is arranged on the substrate. Liquid crystal molecules are aligned according to the above arrangement. When voltage is applied, the alignment of the liquid crystal molecules is further promoted. The polymerizable compound is polymerized by ultraviolet light in the above state, and therefore a polymer in which the alignment is maintained is formed. The alignment of the liquid crystal molecules is additionally stabilized by an effect of the polymer, and a response time of the device is shortened. Image persistence is caused by poor operation of the liquid crystal molecule, and therefore is also simultaneously improved by the effect of the polymer.

EXAMPLES

The invention will be described in greater detail by way of Examples. However, the invention is not limited by the Examples. The invention includes a mixture of composition M1 and composition M2. The invention also includes a mixture in which at least two compositions in Examples are mixed. A compound prepared was identified by methods such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quip, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of liquid crystal compounds is detected by gas chromatograph (FID). An area ratio of each peak in the gas chromatogram corresponds to the proportion of the liquid crystal compound. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

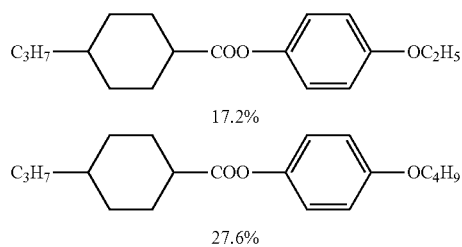

17.2%

27.6%

20.7%

20.7%

13.8%

Measuring method: Characteristics were measured according to methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_c$ was expressed as $T_c$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was injected into a VA device in which a distance (cell gap) between two glass substrates was 20 micrometers. Voltage was applied stepwise to the device in the range from 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) on page 40 of the paper presented by M. Imai et al. Dielectric anisotropy required for the calculation was measured according to measurement (6).

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: $\Delta n = n\| - n\bot$.

(6) Dielectric anisotropy (Δε; measured at 25° C.): A value of dielectric anisotropy was calculated from an equation: $\Delta\varepsilon = \varepsilon\| - \varepsilon\bot$. A dielectric constant (ε∥ and ε⊥) was measured as described below.

(1) Measurement of dielectric constant (ε∥): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (EDD) of liquid crystal molecules in a major axis direction was measured.

(2) Measurement of dielectric constant (ε⊥): A polyimide solution was applied to a well-cleaned glass substrate. After calcining the glass substrate, rubbing treatment was applied to the alignment film obtained. A sample was injected into a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

(7) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in teens of voltage at 10% transmittance.

(8) Voltage holding ratio (VHR-1; measured at 25° C.; %): A TN device used for measurement had a polyimide alignment film, and a distance (cell gap) between two glass substrates was 5 micrometers. A sample was injected into the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set to 5 kHz. A sample was put in a VA device having no alignment film in which a distance (cell gap) between two glass substrates was 3.5 micrometers. The device was sealed with an ultraviolet-curable adhesive. The device was irradiated with ultraviolet light of 78 mW/cm$^2$ (405 nm) for 449 seconds (35J) while a voltage of 30 V was applied to the device. A multi-metal lamp M04-L41 for ultraviolet curing made by EYE GRAPHICS CO., LTD. was used for irradiation with ultraviolet light. Rectangular waves (120 Hz) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. The maximum voltage of the rectangular wave was set so as to obtain 90% transmittance. The minimum voltage of the rectangular wave was set to 2.5V at 0% transmittance. A response time was expressed in terms of time required for a change from 10% transmittance to 90% transmittance (rise time; millisecond).

(13) Elastic constant (K11: spray elastic constant, K33: bend elastic constant; measured at 25° C.; pN): For measurement, Elastic Constant Measurement System Model EC-1 made by TOYO Corporation was used. A sample was put into a vertical alignment device in which a distance (cell gap) between two glass substrates was 20 micrometers. Voltage of 20 V to 0 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku, in Japanese; Nikkan Kogyo Shimbun, Ltd.), and values of elastic constant were obtained from equation (2.100).

(14) Specific resistance (ρ; measured at 25° C.; Ωcm): Into a vessel equipped with electrodes, 1.0 milliliter of a sample was put. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}. (Formula 1)

(15) Pretilt angle (degree): For measurement of a pretilt angle, a spectral ellipsometer M-2000U (made by J. A. Woollam Co., Inc.) was used.

(16) Alignment stability (liquid crystal orientation axis stability): A change in a liquid crystal orientation axis on a side of an electrode of a liquid crystal display device was evaluated. A liquid crystal orientation angle ø (before) on the side of the electrode before stress application was measured, and then after rectangular waves (4.5 V, 60 Hz) were applied to the device for 20 minutes, a short-circuit was formed for 1 second, and liquid crystal orientation angles ø (after) on the side of the electrode were measured again after 1 second and after 5 minutes, respectively. From the measured values, changes Δø(deg.) in the liquid crystal orientation angles after 1 second and after 5 minutes were calculated, respectively, by using the following equation: Δø(deg.)=ø(after)−ø(before) (Formula 2). The above measurement was carried out with reference to J. Hilfiker, B. Johs, C. Herzinger, J. F. Elman, E. Montbach, D. Bryant, and P. J. Bos, Thin Solid Films, 455-456, (2004) 596-600. Smaller Δø can be reasonably referred to as being smaller in a change ratio and better in stability of the liquid crystal orientation axis.

Synthesis Example 1

Compound (1-1) was prepared by the following method.

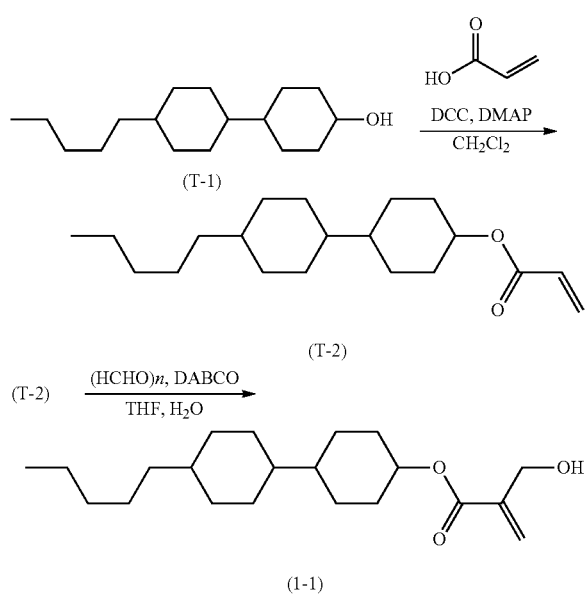

First Step

Compound (T-1) (25.0 g), acrylic acid (7.14 g), 4-dimethylaminopyridine (DMAP; 1.21 g) and dichloromethane (300 mL) were put in a reaction vessel, and the resulting mixture was cooled to 0° C. A dichloromethane (125 mL) solution of 1,3-dicyclohexylcarbodiimide (DCC; 24.5 g) was slowly added dropwise thereto, and the resulting mixture was stirred for 12 hours while returning to room temperature. An insoluble matter was filtered, and then a reaction mixture was poured into water, and an aqueous layer thereof was subjected to extraction with dichloromethane. A combined organic layer was washed with water, and dried over anhydrous magnesium sulfate. The obtained solution was concentrated under reduced pressure, and the resulting residue was purified by silica gel chromatography (a volume ratio, heptane:toluene=2:1), and further purified by recrystallization from Solmix (registered trademark) A-11 to obtain compound (T-2) (11.6 g, 38%). In addition, Solmix (registered trademark) A-11 is a mixture of ethanol (85.50), methanol (13.4) and isopropanol (1.10), and was purchased from Japan Alcohol Trading Co., Ltd.

Second Step

Paraformaldehyde (2.75 g), 1,4-diazabicyclo [2.2.2]octane (DABCO; 4.62 g) and water (40 mL) were put in a reaction vessel, and the resulting mixture was stirred at room temperature for 15 minutes. A THF (90 mL) solution of compound (T-2) (6.31 g) was added dropwise thereto, and the resulting mixture was stirred at room temperature for 72 hours. A reaction mixture was poured into water, and an aqueous layer thereof was subjected to extraction with ethyl acetate. A combined organic layer was washed with water, and dried over anhydrous magnesium sulfate. The obtained solution was concentrated under reduced pressure, and the resulting residue was purified by silica gel chromatography (a volume ratio, toluene:ethyl acetate=5:1), and further purified by recrystallization from a mixed solvent (a volume ratio, heptane:toluene=1:1) to obtain compound (1-1) (1.97 g; 290).

Compound (1-1)

$^1$H-NMR: Chemical shifts δ (ppm; CDCl$_3$): 6.23 (s, 1H), 5.79 (d, J=1.2 Hz, 1H), 4.79-4.70 (m, 1H), 4.32 (d, J=6.7 Hz, 2H), 2.29 (t, J=6.7 Hz, 1H), 2.07-2.00 (m, 2H), 1.83-1.67 (m, 6H), 1.42-1.18 (m, 8H), 1.18-0.91 (m, 9H), 0.91-0.79 (m, 5H).

Examples of compositions were described below. The component compounds were represented using symbols according to definitions in Table 3 described below. In Table 3, the configuration of 1,4-cyclohexylene is trans. A parenthesized number next to a symbolized compound represents a chemical formula to which the compound belongs. A symbol (–) means any other liquid crystal compound. A proportion (percentage) of the liquid crystal compound is expressed in terms of weight percent (% by weight) based on the weight of the liquid crystal composition containing no additive. Values of the characteristics of the composition were summarized in a last part.

TABLE 3

| Method for description of compounds using symbols R—(A$_1$)—Z$_1$— . . . —Z$_n$—(A$_n$)—R' | |
|---|---|
| 1) Left-terminal group R— | Symbol |
| FC$_n$H$_{2n}$— | Fn— |
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| C$_m$H$_{2m+1}$CF$_2$C$_n$H$_{2n}$— | m(CF2)n— |
| CH$_2$=CHCOO— | AC— |
| CH$_2$=C(CH$_3$)COO— | MAC— |
| 2) Right-terminal group —R' | Symbol |
| —C$_n$H$_{2n+1}$ | -n |
| —OC$_n$H$_{2n+1}$ | —On |
| —CH=CH$_2$ | —V |

TABLE 3-continued

Method for description of compounds using symbols
R—(A₁)—Z₁— . . . —Zₙ—(Aₙ)—R'

| | |
|---|---|
| —CH=CH—CₙH₂ₙ₊₁ | —Vn |
| —CₙH₂ₙ—CH=CH₂ | —nV |
| —CₘH₂ₘ—CH=CH—CₙH₂ₙ₊₁ | —mVn |
| —CH=CF₂ | —VFF |
| —OCOCH=CH₂ | —AC |
| —OCOC(CH₃)=CH₂ | —MAC |

3) Bonding group —Zₙ—  Symbol

| | |
|---|---|
| —CₙH₂ₙ— | n |
| —COO— | E |
| —CH=CH— | V |
| —CH=CHO— | VO |
| —OCH=CH— | OV |
| —CH₂O— | 1O |
| —OCH₂— | O1 |

4) Ring structure —Aₙ—  Symbol

 H

 B

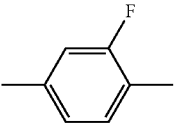 B(F)

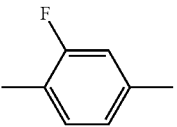 B(2F)

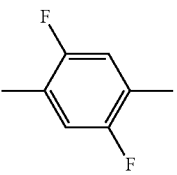 B(2F,5F)

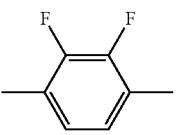 B(2F,3F)

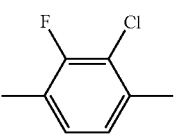 B(2F,3Cl)

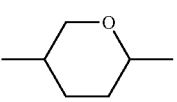 dh

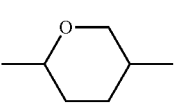 Dh

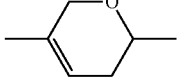 dpr

 Dpr

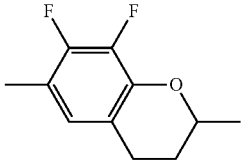 Cro(7F,8F)

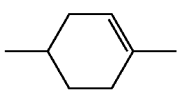 ch

5) Examples of description

Example 1 V-HHB(2F,3F)—O2

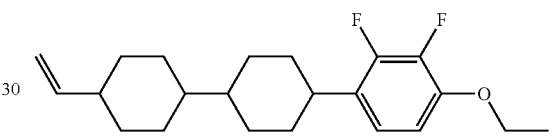

Example 2 5-DprB(2F,3F)—O2

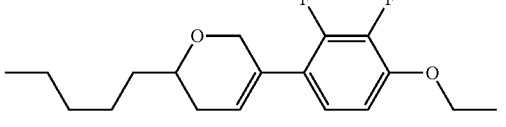

Example 3 3-HBB-1

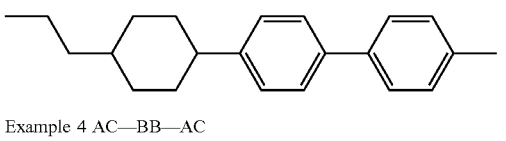

Example 4 AC—BB—AC

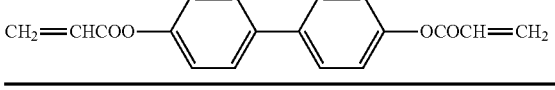

Example of a Device
1. Raw Material

A composition in which a polar compound was added was injected into a device having no alignment film. After the device was irradiated with ultraviolet light, vertical alignment of liquid crystal molecules in the device was examined. A raw material will be described first. Raw materials were selected from compositions (M1) to (M20), polar compounds (PC-1) to (PC-10) and polymerizable compounds (RM-1) to (RM-8). Compositions are as described below.
Composition M1

| | | |
|---|---|---|
| 3-H1OB(2F)B(2F,3F)-O2 | (2) | 3% |
| 3-HB(2F)B(2F,3F)-O2 | (2-3) | 3% |

-continued

| | | |
|---|---|---|
| V-HB(2F)B(2F,3F)-O2 | (2-3) | 5% |
| 2-HH-3 | (3-1) | 14% |
| 3-HB-O1 | (3-2) | 5% |
| 3-HHB-1 | (3-5) | 3% |
| 3-HHB-O1 | (3-5) | 3% |
| 3-HHB-3 | (3-5) | 4% |
| 2-BB(F)B-3 | (3-8) | 4% |
| 3-HB(2F,3F)-O2 | (4-1) | 8% |
| 5-HB(2F,3F)-O2 | (4-1) | 6% |
| 2-BB(2F,3F)-O2 | (4-4) | 7% |
| 3-BB(2F,3F)-O2 | (4-4) | 7% |
| 2-HHB(2F,3F)-O2 | (4-5) | 5% |
| 3-HHB(2F,3F)-O2 | (4-5) | 8% |
| 2-HBB(2F,3F)-O2 | (4-9) | 7% |
| 3-HBB(2F,3F)-O2 | (4-9) | 8% |

NI=79.8° C.; Tc<−20° C.; Δn=0.119; Δε=−3.9; Vth=2.21 V; η=25.2 mPa·s.
Composition M2

| | | |
|---|---|---|
| 3-B(2F)B(2F,3F)-O2 | (2-1) | 4% |
| 5-HB(2F,3F)B(2F,3F)-O2 | (2-3) | 3% |
| 3-HB(F)B(2F,3F)-O2 | (2-4) | 5% |
| 2-HH-3 | (3-1) | 12% |
| 1-BB-5 | (3-3) | 12% |
| 3-HHB-1 | (3-5) | 4% |
| 3-HHB-O1 | (3-5) | 3% |
| 3-HBB-2 | (3-6) | 3% |
| 3-HB(2F,3F)-O4 | (4-1) | 4% |
| 3-H2B(2F,3F)-O2 | (4-2) | 6% |
| 3-H1OB(2F,3F)-O2 | (4-3) | 3% |
| 3-BB(2F,3F)-O2 | (4-4) | 5% |
| 2-HHB(2F,3F)-O2 | (4-5) | 7% |
| 3-HHB(2F,3F)-O2 | (4-5) | 6% |
| 3-HH2B(2F,3F)-O2 | (4-6) | 6% |
| 5-HH2B(2F,3F)-O2 | (4-6) | 4% |
| 2-HBB(2F,3F)-O2 | (4-9) | 5% |
| 3-HBB(2F,3F)-O2 | (4-9) | 4% |
| 4-HBB(2F,3F)-O2 | (4-9) | 4% |

NI=83.8° C.; Tc<−30° C.; Δn=0.122; Δε=−4.4; Vth=2.13 V; η=25.0 mPa·s.
Composition M3

| | | |
|---|---|---|
| 3-B(F)B(2F,3F)-O2 | (2-2) | 3% |
| 3-BB(2F)B(2F,3F)-O2 | (2-5) | 5% |
| 5-BB(2F)B(2F,3F)-O2 | (2-5) | 4% |
| 3-HH-V | (3-1) | 25% |
| 3-HH-V1 | (3-1) | 6% |
| V-HHB-1 | (3-5) | 3% |
| 3-HB(2F,3F)-O2 | (4-1) | 7% |
| 5-HB(2F,3F)-O2 | (4-1) | 7% |
| 3-BB(2F,3F)-O2 | (4-4) | 7% |
| 3-HHB(2F,3F)-O2 | (4-5) | 4% |
| 5-HHB(2F,3F)-O2 | (4-5) | 4% |
| 3-HH1OB(2F,3F)-O2 | (4-7) | 3% |
| 2-BB(2F,3F)B-3 | (4-8) | 4% |
| 2-HBB(2F,3F)-O2 | (4-9) | 3% |
| 3-HBB(2F,3F)-O2 | (4-9) | 5% |
| 4-HBB(2F,3F)-O2 | (4-9) | 4% |
| 5-HBB(2F,3F)-O2 | (4-9) | 6% |

NI=74.1° C.; Tc<−30° C.; Δn=0.117; Δε=−3.3; Vth=1.98 V; η=18.5 mPa·s.
Composition M4

| | | |
|---|---|---|
| 2-HB(2F)B(2F,3F)-O2 | (2-3) | 3% |
| 3-HB(2F)B(2F,3F)-O2 | (2-3) | 5% |
| 5-BB(2F)B(2F,3F)-O2 | (2-5) | 3% |
| 2-BB(2F)B(2F,3F)-O4 | (2-5) | 3% |
| 3-HH-4 | (3-1) | 16% |
| V-HHB-1 | (3-5) | 10% |
| 3-HBB-2 | (3-6) | 7% |
| 3-HB(2F,3F)-O2 | (4-1) | 8% |
| 5-HB(2F,3F)-O2 | (4-1) | 8% |
| 3-H2B(2F,3F)-O2 | (4-2) | 6% |
| 5-H2B(2F,3F)-O2 | (4-2) | 6% |
| 2-HBB(2F,3F)-O2 | (4-9) | 4% |
| 3-HBB(2F,3F)-O2 | (4-9) | 7% |
| 4-HBB(2F,3F)-O2 | (4-9) | 5% |
| 5-HBB(2F,3F)-O2 | (4-9) | 6% |
| 3-HDhB(2F,3F)-O2 | (4-14) | 3% |

NI=94.3° C.; Tc<−30° C.; Δn=0.119; Δε=−3.7; Vth=2.32 V; η=27.0 mPa·s.
Composition M5

| | | |
|---|---|---|
| 3-B(2F)B(2F,3F)-O2 | (2-1) | 5% |
| 3-BB(F)B(2F,3F)-O2 | (2-6) | 4% |
| 3-HH-V | (3-1) | 5% |
| 3-HH-O1 | (3-1) | 3% |
| 1-BB-5 | (3-3) | 4% |
| V-HHB-1 | (3-5) | 4% |
| 5-HB(F)BH-3 | (3-12) | 5% |
| 3-HB(2F,3F)-O2 | (4-1) | 7% |
| 3-HB(2F,3F)-O4 | (4-1) | 7% |
| 3-H2B(2F,3F)-O2 | (4-2) | 8% |
| 3-BB(2F,3F)-O2 | (4-4) | 7% |
| 2-HHB(2F,3F)-O2 | (4-5) | 4% |
| 3-HHB(2F,3F)-O2 | (4-5) | 6% |
| 3-HHB(2F,3F)-1 | (4-5) | 6% |
| 2-HBB(2F,3F)-O2 | (4-9) | 5% |
| 3-HBB(2F,3F)-O2 | (4-9) | 5% |
| 4-HBB(2F,3F)-O2 | (4-9) | 5% |
| 5-HBB(2F,3F)-O2 | (4-9) | 4% |
| 3-H1OCro(7F,8F)-5 | (4-12) | 3% |
| 3-HDhB(2F,3F)-O2 | (4-14) | 3% |

NI=75.3° C.; Tc<−30° C.; Δn=0.121; Δε=−4.2; Vth=1.71 V; η=29.4 mPa·s.
Composition M6

| | | |
|---|---|---|
| 2-HB(2F)B(2F,3F)-O2 | (2-3) | 5% |
| 3-HB(2F)B(2F,3F)-O2 | (2-3) | 5% |
| 5-HB(2F)B(2F,3F)-O2 | (2-3) | 5% |
| 3-HB(F)B(2F,3F)-O2 | (2-4) | 5% |
| 5-HH-V | (3-1) | 18% |
| 7-HB-1 | (3-2) | 5% |
| V-HHB-1 | (3-5) | 7% |
| V2-HHB-1 | (3-5) | 7% |
| 3-HBB(F)B-3 | (3-13) | 8% |
| 3-HB(2F,3F)-O4 | (4-1) | 15% |
| 3-dhBB(2F,3F)-O2 | (4-15) | 5% |
| 3-chB(2F,3F)-O2 | (4-16) | 7% |
| 2-HchB(2F,3F)-O2 | (4-17) | 8% |

NI=92.2° C.; Tc<−30° C.; Δn=0.109; Δε=−3.2; Vth=2.45 V; η=25.8 mPa·s.
Composition M7

| | | |
|---|---|---|
| 2-HB(2F)B(2F,3F)-O2 | (2-3) | 3% |
| 3-HB(2F)B(2F,3F)-O2 | (2-3) | 5% |
| 5-HB(2F)B(2F,3F)-O2 | (2-3) | 4% |
| 3-HH-V | (3-1) | 14% |
| 3-HH-VFF | (3-1) | 7% |
| F3-HH-V | (3-1) | 10% |
| 3-HHEH-3 | (3-4) | 4% |
| 3-HB(F)HH-2 | (3-10) | 4% |
| 3-HHEBH-3 | (3-11) | 4% |
| 3-H2B(2F,3F)-O2 | (4-2) | 15% |
| 5-H2B(2F,3F)-O2 | (4-2) | 10% |
| 3-HHB(2F,3Cl)-O2 | (4-10) | 4% |

| | | |
|---|---|---|
| 3-HBB(2F,3Cl)-O2 | (4-11) | 6% |
| 5-HBB(2F,3Cl)-O2 | (4-11) | 6% |
| 3-HDhB(2F,3F)-O2 | (4-14) | 4% |

NI=85.1° C.; Tc<−30° C.; Δn=0.092; Δε=−2.5; Vth=2.46 V; η=23.9 mPa·s.

Composition M8

| | | |
|---|---|---|
| 3-H1OB(2F)B(2F,3F)-O2 | (2) | 3% |
| V-HB(2F)B(2F,3F)-O2 | (2-3) | 4% |
| 2-BB(2F)B(2F,3F)-O4 | (2-5) | 5% |
| 3-HH-V | (3-1) | 12% |
| 1-BB-5 | (3-3) | 5% |
| 3-HB(2F,3F)-O2 | (4-1) | 7% |
| 3-H2B(2F,3F)-O2 | (4-2) | 10% |
| 3-BB(2F,3F)-O2 | (4-4) | 10% |
| 2O-BB(2F,3F)-O2 | (4-4) | 3% |
| 2-HHB(2F,3F)-O2 | (4-5) | 3% |
| 3-HHB(2F,3F)-O2 | (4-5) | 7% |
| 2-HHB(2F,3F)-1 | (4-5) | 4% |
| 2-BB(2F,3F)B-3 | (4-8) | 5% |
| 2-BB(2F,3F)B-4 | (4-8) | 4% |
| 2-HBB(2F,3F)-O2 | (4-9) | 4% |
| 3-HBB(2F,3F)-O2 | (4-9) | 7% |
| 3-HH1OCro(7F,8F)-5 | (4-13) | 3% |
| 3-dhBB(2F,3F)-O2 | (4-15) | 4% |

NI=71.0° C.; Tc<−20° C.; Δn=0.137; Δε=−4.3; Vth=1.68 V; η=28.9 mPa·s.

Composition M9

| | | |
|---|---|---|
| 3-B(F)B(2F,3F)-O2 | (2-2) | 2% |
| 3-BB(2F)B(2F,3F)-O2 | (2-5) | 3% |
| 3-BB(F)B(2F,3F)-O2 | (2-6) | 3% |
| 3-HH-V | (3-1) | 14% |
| 3-HHB-1 | (3-5) | 4% |
| 3-HHB-O1 | (3-5) | 4% |
| V-HBB-2 | (3-6) | 4% |
| 1-BB(F)B-2V | (3-8) | 6% |
| 3-HB(2F,3F)-O4 | (4-1) | 14% |
| 3-H1OB(2F,3F)-O2 | (4-3) | 3% |
| 3-BB(2F,3F)-O2 | (4-4) | 10% |
| 2-HHB(2F,3F)-O2 | (4-5) | 7% |
| 3-HHB(2F,3F)-O2 | (4-5) | 7% |
| 3-HH1OB(2F,3F)-O2 | (4-7) | 6% |
| 2-HBB(2F,3F)-O2 | (4-9) | 3% |
| 3-HBB(2F,3F)-O2 | (4-9) | 4% |
| 4-HBB(2F,3F)-O2 | (4-9) | 3% |
| 5-HBBH-1O1 | (—) | 3% |

NI=91.7° C.; Tc<−30° C.; Δn=0.128; Δε=−4.3; Vth=2.25 V; η=32.1 mPa·s.

Composition M10

| | | |
|---|---|---|
| 2-HB(2F)B(2F,3F)-O2 | (2-3) | 3% |
| 3-HB(2F)B(2F,3F)-O2 | (2-3) | 5% |
| 5-HB(2F)B(2F,3F)-O2 | (2-3) | 3% |
| 3-BB(2F)B(2F,3F)-O2 | (2-5) | 4% |
| 3-HH-V | (3-1) | 11% |
| 1-BB-3 | (3-3) | 6% |
| 3-HHB-1 | (3-5) | 4% |
| 3-HHB-O1 | (3-5) | 4% |
| 3-HBB-2 | (3-6) | 4% |
| 3-B(F)BB-2 | (3-7) | 4% |
| 3-HB(2F,3F)-O4 | (4-1) | 6% |
| 3-H2B(2F,3F)-O2 | (4-2) | 8% |
| 3-H1OB(2F,3F)-O2 | (4-3) | 5% |
| 3-BB(2F,3F)-O2 | (4-4) | 9% |
| 2-HHB(2F,3F)-O2 | (4-5) | 5% |
| 3-HHB(2F,3F)-O2 | (4-5) | 5% |
| 5-HHB(2F,3F)-O2 | (4-5) | 5% |
| 2-HBB(2F,3F)-O2 | (4-9) | 3% |
| 3-HBB(2F,3F)-O2 | (4-9) | 3% |
| 5-HBB(2F,3F)-O2 | (4-9) | 3% |

NI=85.1° C.; Tc<−30° C.; Δn=0.133; Δε=−4.5; Vth=2.20 V; η=27.3 mPa·s.

Composition M11

| | | |
|---|---|---|
| 3-B(2F)B(2F,3F)-O2 | (2-1) | 3% |
| 3-HB(2F)B(2F,3F)-O2 | (2-3) | 3% |
| 3-BB(2F)B(2F,3F)-O2 | (2-5) | 3% |
| 5-BB(2F)B(2F,3F)-O2 | (2-5) | 3% |
| 2-HH-3 | (3-1) | 12% |
| 1-BB-3 | (3-3) | 6% |
| 3-HHB-1 | (3-5) | 3% |
| 3-HHB-O1 | (3-5) | 4% |
| 3-HBB-2 | (3-6) | 6% |
| 3-B(F)BB-2 | (3-7) | 3% |
| 3-HB(2F,3F)-O4 | (4-1) | 6% |
| 3-H2B(2F,3F)-O2 | (4-2) | 7% |
| 3-H1OB(2F,3F)-O2 | (4-3) | 4% |
| 3-BB(2F,3F)-O2 | (4-4) | 6% |
| 2-HHB(2F,3F)-O2 | (4-5) | 6% |
| 3-HHB(2F,3F)-O2 | (4-5) | 8% |
| 5-HHB(2F,3F)-O2 | (4-5) | 6% |
| 2-HBB(2F,3F)-O2 | (4-9) | 3% |
| 3-HBB(2F,3F)-O2 | (4-9) | 5% |
| 5-HBB(2F,3F)-O2 | (4-9) | 3% |

NI=88.4° C.; Tc<−20° C.; Δn=0.132; Δε=−4.5; Vth=2.19 V; η=26.4 mPa·s.

Composition M12

| | | |
|---|---|---|
| 3-B(2F)B(2F,3F)-O2 | (2-1) | 4% |
| 3-B(F)B(2F,3F)-O2 | (2-2) | 4% |
| 3-HH-V | (3-1) | 33% |
| V-HHB-1 | (3-5) | 3% |
| 3-HB(2F,3F)-O2 | (4-1) | 7% |
| 5-HB(2F,3F)-O2 | (4-1) | 7% |
| 3-HHB(2F,3F)-O2 | (4-5) | 4% |
| 5-HHB(2F,3F)-O2 | (4-5) | 5% |
| 3-HH1OB(2F,3F)-O2 | (4-7) | 5% |
| 2-BB(2F,3F)B-3 | (4-8) | 4% |
| 2-HBB(2F,3F)-O2 | (4-9) | 3% |
| 3-HBB(2F,3F)-O2 | (4-9) | 8% |
| 4-HBB(2F,3F)-O2 | (4-9) | 5% |
| 5-HBB(2F,3F)-O2 | (4-9) | 8% |

NI=74.2° C.; Tc<−20° C.; Δn=0.102; Δε=−3.2; Vth=2.05 V; η=17.1 mPa·s.

Composition M13

| | | |
|---|---|---|
| 3-HB(2F)B(2F,3F)-O2 | (2-3) | 3% |
| V-HB(2F)B(2F,3F)-O2 | (2-3) | 3% |
| 3-BB(2F)B(2F,3F)-O2 | (2-5) | 5% |
| 5-BB(2F)B(2F,3F)-O2 | (2-5) | 4% |
| 2-HH-3 | (3-1) | 5% |
| 3-HH-VFF | (3-1) | 30% |
| 1-BB-3 | (3-3) | 5% |
| 3-HHB-1 | (3-5) | 3% |
| 3-HBB-2 | (3-6) | 3% |
| 3-H1OB(2F,3F)-O2 | (4-3) | 3% |
| 2-H1OB(2F,3F)-O2 | (4-3) | 5% |
| 3-BB(2F,3F)-O2 | (4-4) | 3% |
| 2-HH1OB(2F,3F)-O2 | (4-7) | 10% |
| 2-HBB(2F,3F)-O2 | (4-9) | 5% |
| 3-HBB(2F,3F)-O2 | (4-9) | 7% |
| 5-HBB(2F,3F)-O2 | (4-9) | 6% |

NI=78.8° C.; Tc<−20° C.; Δn=0.116; Δε=−3.1; Vth=2.19 V; η=19.4 mPa·s.

Composition M14

| | | |
|---|---|---|
| 3-HB(2F)B(2F,3F)-O2 | (2-3) | 5% |
| 3-HB(F)B(2F,3F)-O2 | (2-4) | 5% |
| 3-HH-V | (3-1) | 27% |
| 3-HH-V1 | (3-1) | 6% |
| V-HHB-1 | (3-5) | 5% |
| 3-HB(2F,3F)-O2 | (4-1) | 5% |
| 5-HB(2F,3F)-O2 | (4-1) | 7% |
| 3-BB(2F,3F)-O2 | (4-4) | 8% |
| 3-HHB(2F,3F)-O2 | (4-5) | 5% |
| 5-HHB(2F,3F)-O2 | (4-5) | 4% |
| 3-HH1OB(2F,3F)-O2 | (4-7) | 3% |
| 2-BB(2F,3F)B-3 | (4-8) | 4% |
| 2-HBB(2F,3F)-O2 | (4-9) | 3% |
| 3-HBB(2F,3F)-O2 | (4-9) | 5% |
| 4-HBB(2F,3F)-O2 | (4-9) | 3% |
| 5-HBB(2F,3F)-O2 | (4-9) | 5% |

NI=78.2° C.; Tc<−20° C.; Δn=0.107; Δε=−3.2; Vth=2.11 V; η=16.6 mPa·s.

Composition M15

| | | |
|---|---|---|
| 3-BB(2F)B(2F,3F)-O2 | (2-5) | 5% |
| 2-BB(2F)B(2F,3F)-O4 | (2-5) | 3% |
| 3-BB(F)B(2F,3F)-O2 | (2-6) | 3% |
| 3-HH-V1 | (3-1) | 6% |
| 4-HH-V | (3-1) | 15% |
| 1-HH-2V1 | (3-1) | 6% |
| 3-HH-2V1 | (3-1) | 4% |
| V2-BB-1 | (3-3) | 5% |
| 1V2-BB-1 | (3-3) | 5% |
| 3-HHB-1 | (3-5) | 6% |
| 3-HB(F)BH-3 | (3-12) | 4% |
| 3-H2B(2F,3F)-O2 | (4-2) | 7% |
| 3-HHB(2F,3F)-O2 | (4-5) | 8% |
| 3-HH1OB(2F,3F)-O2 | (4-7) | 4% |
| 2-BB(2F,3F)B-3 | (4-8) | 3% |
| 2-BB(2F,3F)B-4 | (4-8) | 3% |
| 3-HDhB(2F,3F)-O2 | (4-14) | 3% |
| 5-HDhB(2F,3F)-O2 | (4-14) | 4% |
| 2-HchB(2F,3F)-O2 | (4-17) | 6% |

NI=90.0° C.; Tc<−30° C.; Δn=0.121; Δε=−2.2; Vth=2.80 V; η=20.2 mPa·s.

Composition M16

| | | |
|---|---|---|
| 2-HB(2F)B(2F,3F)-O2 | (2-3) | 4% |
| 3-HB(2F)B(2F,3F)-O2 | (2-3) | 4% |
| 5-HB(2F)B(2F,3F)-O2 | (2-3) | 4% |
| V-HB(2F)B(2F,3F)-O2 | (2-3) | 3% |
| 3-HB(F)B(2F,3F)-O2 | (2-4) | 3% |
| 2-HH-3 | (3-1) | 12% |
| 1-BB-5 | (3-3) | 15% |
| 3-HHB-O1 | (3-5) | 3% |
| 3-HBB-2 | (3-6) | 3% |
| V2-H2B(2F,3F)-O2 | (4-2) | 6% |
| V2-H1OB(2F,3F)-O4 | (4-3) | 3% |
| 3-BB(2F,3F)-O2 | (4-4) | 6% |
| 2-HHB(2F,3F)-O2 | (4-5) | 6% |
| 3-HHB(2F,3F)-O2 | (4-5) | 6% |
| 3-HH2B(2F,3F)-O2 | (4-6) | 6% |
| 5-HH2B(2F,3F)-O2 | (4-6) | 3% |
| V-HH2B(2F,3F)-O2 | (4-6) | 5% |
| V2-HBB(2F,3F)-O2 | (4-9) | 4% |
| V-HBB(2F,3F)-O2 | (4-9) | 4% |

NI=86.9° C.; Tc<−20° C.; Δn=0.129; Δε=−4.3; Vth=2.13 V; η=26.7 mPa·s.

Composition M17

| | | |
|---|---|---|
| 3-B(2F)B(2F,3F)-O2 | (2-1) | 3% |
| 3-HB(2F)B(2F,3F)-O2 | (2-3) | 5% |
| 5-HB(2F)B(2F,3F)-O2 | (2-3) | 4% |
| 3-BB(2F)B(2F,3F)-O2 | (2-5) | 3% |
| 3-HH-V | (3-1) | 25% |
| 3-HH-V1 | (3-1) | 4% |
| V-HHB-1 | (3-5) | 3% |
| 3-B2BB-2 | (3-9) | 3% |
| 3-HB(2F,3F)-O2 | (4-1) | 3% |
| V-HB(2F,3F)-O2 | (4-1) | 3% |
| V2-HB(2F,3F)-O2 | (4-1) | 3% |
| 5-H2B(2F,3F)-O2 | (4-2) | 3% |
| V2-BB(2F,3F)-O2 | (4-4) | 3% |
| 1V2-BB(2F,3F)-O2 | (4-4) | 3% |
| 3-HHB(2F,3F)-O2 | (4-5) | 6% |
| V-HHB(2F,3F)-O2 | (4-5) | 4% |
| V-HHB(2F,3F)-O4 | (4-5) | 4% |
| V2-HHB(2F,3F)-O2 | (4-5) | 4% |
| V2-BB(2F,3F)B-1 | (4-8) | 4% |
| V2-HBB(2F,3F)-O2 | (4-9) | 4% |
| V-HBB(2F,3F)-O2 | (4-9) | 3% |
| V-HBB(2F,3F)-O4 | (4-9) | 3% |

NI=79.3° C.; Tc<−20° C.; Δn=0.117; Δε=−3.1; Vth=2.04 V; η=17.3 mPa·s.

Composition M18

| | | |
|---|---|---|
| 3-H1OB(2F)B(2F,3F)-O2 | (2) | 5% |
| 3-B(F)B(2F,3F)-O2 | (2-2) | 3% |
| 3-HB(2F)B(2F,3F)-O2 | (2-3) | 3% |
| 5-HB(2F)B(2F,3F)-O2 | (2-3) | 3% |
| 3-HB(F)B(2F,3F)-O2 | (2-4) | 3% |
| 3-HH-4 | (3-1) | 14% |
| V-HHB-1 | (3-5) | 10% |
| 3-HBB-2 | (3-6) | 7% |
| V-HB(2F,3F)-O2 | (4-1) | 10% |
| V2-HB(2F,3F)-O2 | (4-1) | 10% |
| 3-H1OB(2F,3F)-O2 | (4-3) | 3% |
| 2O-BB(2F,3F)-O2 | (4-4) | 3% |
| V2-BB(2F,3F)-O2 | (4-4) | 4% |
| V2-HHB(2F,3F)-O2 | (4-5) | 4% |
| 2-HBB(2F,3F)-O2 | (4-9) | 3% |
| 3-HBB(2F,3F)-O2 | (4-9) | 3% |
| V-HBB(2F,3F)-O2 | (4-9) | 3% |
| V-HBB(2F,3F)-O4 | (4-9) | 4% |
| V-HHB(2F,3Cl)-O2 | (4-10) | 5% |

NI=79.0° C.; Tc<−20° C.; Δn=0.117; Δε=−4.0; Vth=2.21 V; η=28.8 mPa·s.

Composition M19

| | | |
|---|---|---|
| 2O-B(2F)B(2F,3F)-O2 | (2-1) | 4% |
| 5-HB(2F)B(2F,3F)-O2 | (2-3) | 3% |
| 3-HB(F)B(2F,3F)-O2 | (2-4) | 5% |
| 2-HH-3 | (3-1) | 12% |
| 1-BB-5 | (3-3) | 12% |
| 3-HHB-1 | (3-5) | 4% |
| 3-HHB-O1 | (3-5) | 3% |
| 3-HBB-2 | (3-6) | 3% |
| 3-HB(2F,3F)-O4 | (4-1) | 4% |
| 3-H2B(2F,3F)-O2 | (4-2) | 6% |
| 3-H1OB(2F,3F)-O2 | (4-3) | 3% |
| 3-BB(2F,3F)-O2 | (4-4) | 5% |
| 2-HHB(2F,3F)-O2 | (4-5) | 7% |
| 3-HHB(2F,3F)-O2 | (4-5) | 6% |
| 3-HH2B(2F,3F)-O2 | (4-6) | 6% |
| 5-HH2B(2F,3F)-O2 | (4-6) | 4% |
| 2-HBB(2F,3F)-O2 | (4-9) | 5% |
| 3-HBB(2F,3F)-O2 | (4-9) | 4% |
| 4-HBB(2F,3F)-O2 | (4-9) | 4% |

NI=85.8° C.; Tc<−20° C.; Δn=0.123; Δε−4.5; Vth=2.10 V; η=25.1 mPa·s.

Composition M20
| | | |
|---|---|---|
| 2O-B(2F)B(2F,3F)-O4 | (2-1) | 4% |
| 3-B(F)B(2F,3F)-O2 | (2-2) | 4% |
| 3-HH-V | (3-1) | 33% |
| V-HHB-1 | (3-5) | 3% |
| 3-HB(2F,3F)-O2 | (4-1) | 7% |
| 5-HB(2F,3F)-O2 | (4-1) | 7% |
| 3-HHB(2F,3F)-O2 | (4-5) | 4% |
| 5-HHB(2F,3F)-O2 | (4-5) | 5% |
| 3-HH1OB(2F,3F)-O2 | (4-7) | 5% |
| 2-BB(2F,3F)B-3 | (4-8) | 4% |
| 2-HBB(2F,3F)-O2 | (4-9) | 3% |
| 3-HBB(2F,3F)-O2 | (4-9) | 8% |
| 4-HBB(2F,3F)-O2 | (4-9) | 5% |
| 5-HBB(2F,3F)-O2 | (4-9) | 8% |
NI=76.0° C.; Tc<−20° C.; Δn=0.103; Δε=−3.3; Vth=2.01 V; η=17.9 mPa·s.
First additives are polar compounds (PC-1) to (PC-10).
Second additives are polymerizable compounds (RM-1) to (RM-8).
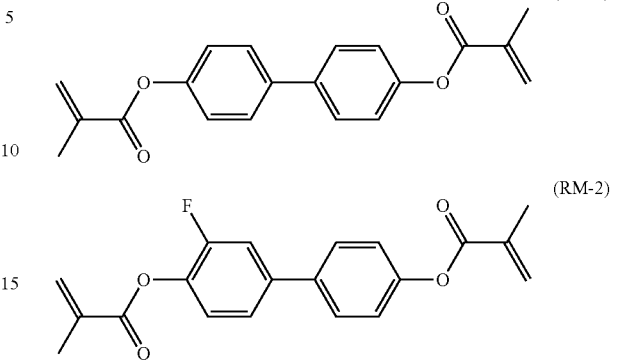
(RM-1)
(RM-2)
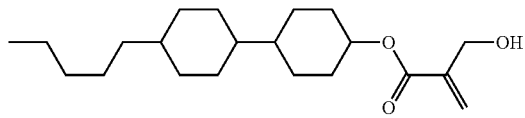
(PC-1)
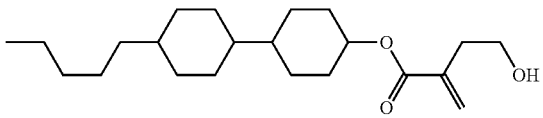
(PC-2)
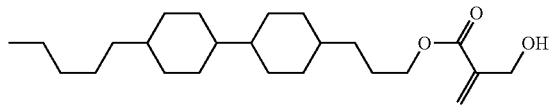
(PC-3)
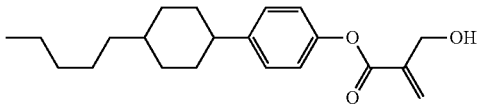
(PC-4)
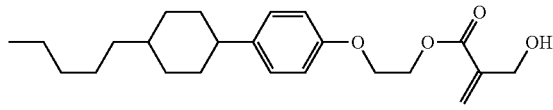
(PC-5)
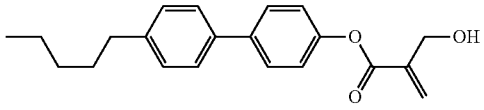
(PC-6)
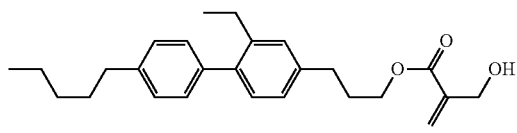
(PC-7)
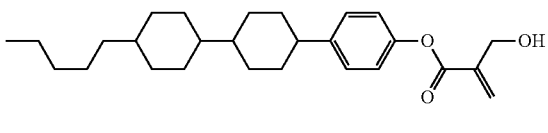
(PC-8)
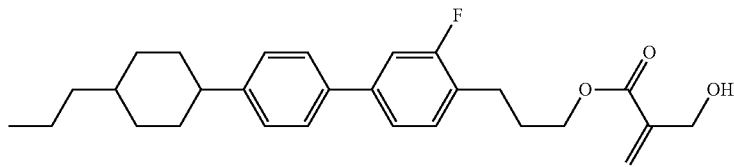
(PC-9)
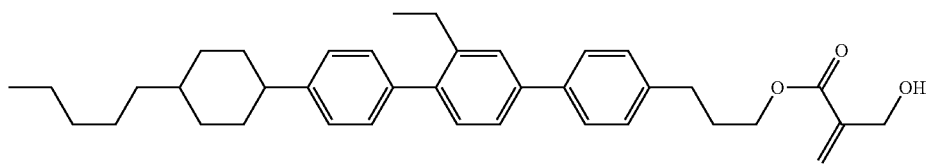
(PC-10)

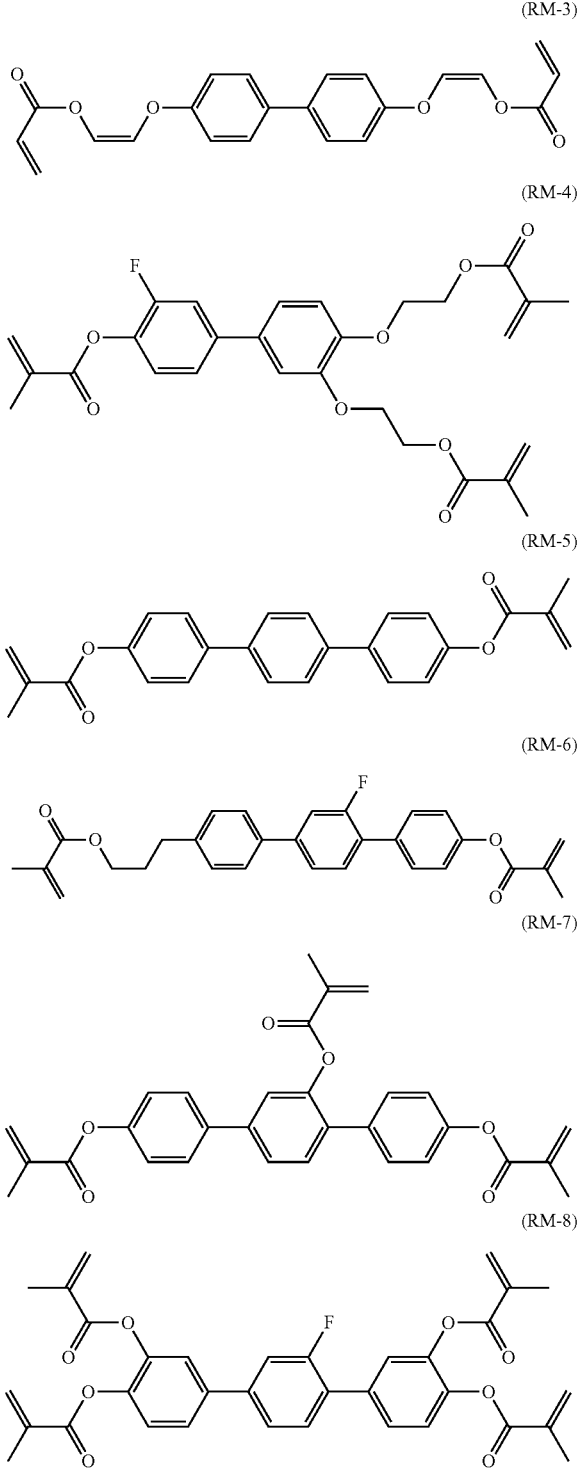

(RM-3)
(RM-4)
(RM-5)
(RM-6)
(RM-7)
(RM-8)

2. Vertical Alignment of Liquid Crystal Molecules

Example 1

To composition (M1), polar compound (PC-1) was added at a proportion of 5% by weight. The resulting mixture was injected, on a hot stage at 100° C., into a device having no alignment film in which a distance (cell gap) between two glass substrates was 4.0 micrometers. Polar compound (PC-1) was polymerized by irradiating the device with ultraviolet light (28 J) using an ultra-high pressure mercury lamp USH-250-BY (made by Ushio, Inc.). The device was set to a polarizing microscope in which a polarizer is arranged perpendicularly to an analyzer, and the device was irradiated with light from below and presence or absence of light leakage was observed. When liquid crystal molecules were sufficiently aligned to prevent light from passing through the device, vertical alignment was judged as "good." When light that had passed through the device was observed, the vertical alignment was represented as "poor."

Examples 2 to 20 and Comparative Example 1

In the Examples, a device having no alignment film was prepared by using a mixture prepared by adding a polar compound to a composition. Presence or absence of light leakage was observed in a manner similar to Example 1. The results were summarized in Table 4. In Example 18, polymerizable compound (RM-1) was also added at a proportion of 0.5% by weight. In Comparative Example 1, polar compound (PC-11) described below was selected for comparison. The above compound has no polymerizable group, and therefore is different from compound (1).

(PC-11)

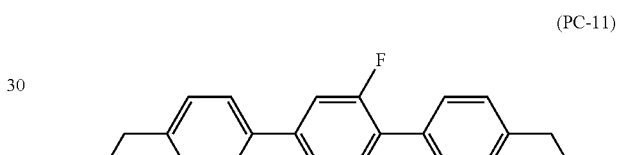

TABLE 4

Vertical alignment of liquid crystal molecules

| Example | Liquid crystal composition | Polar compound (5% by weight) | Polymerizable compound (0.5% by weight) | Vertical alignment |
|---|---|---|---|---|
| 1 | M1 | PC-1 | — | Good |
| 2 | M2 | PC-2 | — | Good |
| 3 | M3 | PC-3 | — | Good |
| 4 | M4 | PC-4 | — | Good |
| 5 | M5 | PC-5 | — | Good |
| 6 | M6 | PC-6 | — | Good |
| 7 | M7 | PC-7 | — | Good |
| 8 | M8 | PC-8 | — | Good |
| 9 | M9 | PC-9 | — | Good |
| 10 | M10 | PC-10 | — | Good |
| 11 | M11 | PC-1 | — | Good |
| 12 | M12 | PC-2 | — | Good |
| 13 | M13 | PC-3 | — | Good |
| 14 | M14 | PC-4 | — | Good |
| 15 | M15 | PC-5 | — | Good |
| 16 | M16 | PC-6 | — | Good |
| 17 | M17 | PC-7 | — | Good |
| 18 | M18 | PC-8 | RM-1 | Good |
| 19 | M19 | PC-9 | — | Good |
| 20 | M20 | PC-10 | — | Good |
| Comparative Example 1 | M1 | PC-11 | — | Poor |

As is obvious from Table 4, in Examples 1 to 20, no light leakage was observed even though a kind of the composition and the polar compound was changed. The above results indicate that the vertical alignment is satisfactory and the liquid crystal molecules are stably aligned even without the alignment film in the device. In Example 18, the same result was obtained even though polymerizable compound (RM-1) was further added. On the other hand, light leakage was observed in Comparative Example 1. The above result indicates that vertical alignment was not satisfactory. Accordingly, a polymer formed from a polar compound having a polymerizable group was found to play an important role on the vertical alignment of the liquid crystal molecules.

INDUSTRIAL APPLICABILITY

According to a liquid crystal composition of the invention, alignment of liquid crystal molecules can be controlled in a device having no alignment film. A liquid crystal display device including the composition has characteristics such as a short response time, a large voltage holding ratio, a low threshold voltage, a large contrast ratio, a long service life and so forth, and therefore can be used in a liquid crystal projector, a liquid crystal television and so forth.

What is claimed is:

1. A liquid crystal composition that has negative dielectric anisotropy, and contains at least one compound represented by formula (1) as a first additive, and at least one compound represented by formula (2) as a first component:

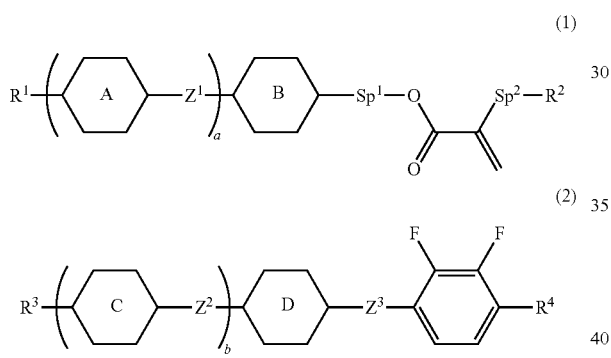

wherein, in formula (1) and formula (2), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $R^2$ is a group represented by —OH, —OR⁰, —NH$_2$, —NHR⁰ or —N(R⁰)$_2$, in which R⁰ is alkyl having 1 to 5 carbons, and in the alkyl, at least one —CH$_2$— may be replaced by —O—, and at least one —CH$_2$CH$_2$— may be replaced by —CH=CH—, and in these groups, at least one hydrogen may be replaced by fluorine; $R^3$ and $R^4$ are independently alkyl having 1 to 12 carbons, alkoxy having 1 to 12 carbons, alkenyl having 2 to 12 carbons or alkenyloxy having 2 to 12 carbons; ring A and ring B are independently, 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracen-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring C is 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 1,4-phenylene in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; $Z^2$ and $Z^3$ are independently a single bond, —CH$_2$CH$_2$—, —CH$_2$O—, —OCH$_2$—, —COO— or —OCO—; $Sp^1$ and $Sp^2$ are independently a single bond or alkylene having 1 to 7 carbons, and in the alkylene, at least one —CH$_2$— may be replaced by —O—, —COO— or —OCO—, and at least one —CH$_2$CH$_2$— may be replaced by —CH=CH—, and in these groups, at least one hydrogen may be replaced by fluorine; a is 0, 1, 2, 3 or 4; and b is 0 or 1.

2. The liquid crystal composition according to claim 1, wherein the first additive is at least one compound selected from the group of polar compounds represented by formula (1-1) to formula (1-9):

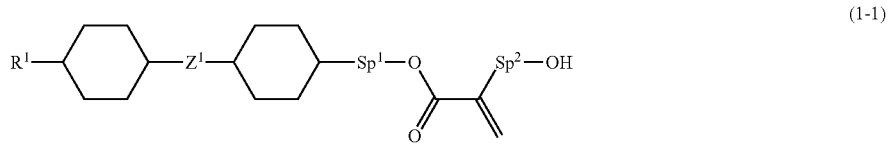

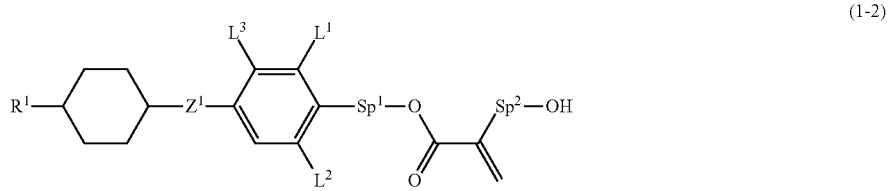

-continued

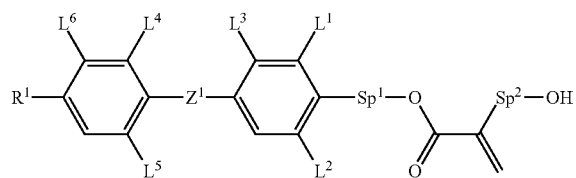
(1-3)

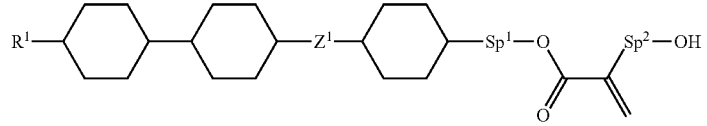
(1-4)

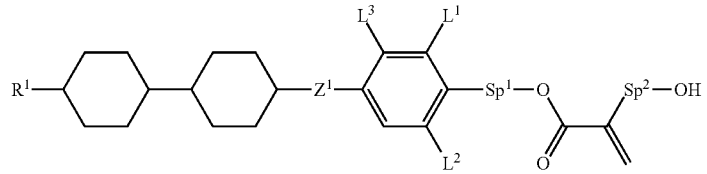
(1-5)

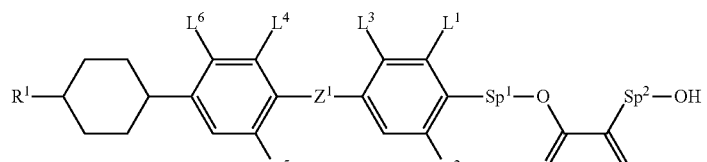
(1-6)

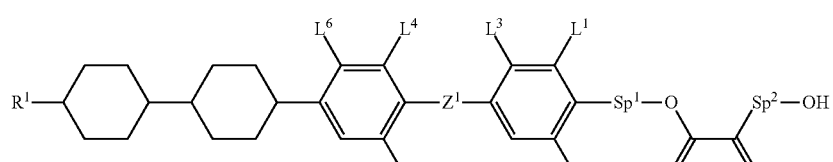
(1-7)

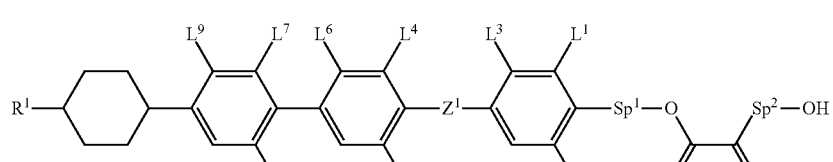
(1-8)

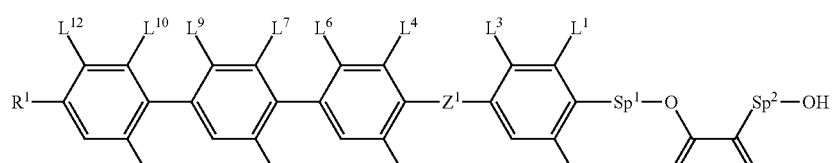
(1-9)

wherein, in formula (1-1) to formula (1-9), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; $Sp^1$ and $Sp^2$ are independently a single bond or alkylene having 1 to 7 carbons, and in the alkylene, at least one —CH$_2$— may be replaced by —O—, —COO— or —OCO—, and at least one —CH$_2$CH$_2$— may be replaced by —CH=CH—, and in these groups, at least one hydrogen may be replaced by fluorine; and $L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl.

3. The liquid crystal composition according to claim 1, containing at least one compound selected from the group of compounds represented by formula (2-1) to formula (2-6) as the first component:

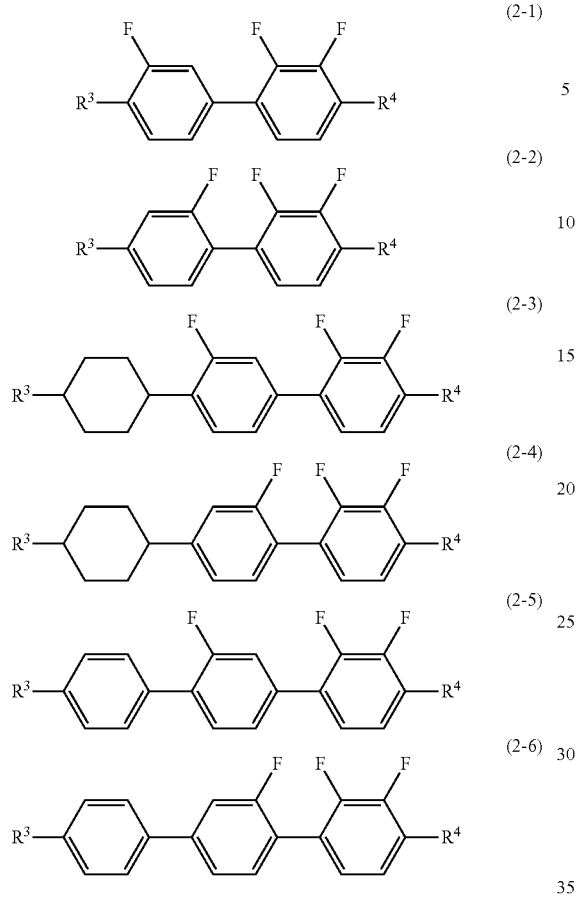

wherein, in formula (2-1) to formula (2-6), $R^3$ and $R^4$ are independently alkyl having 1 to 12 carbons, alkoxy having 1 to 12 carbons, alkenyl having 2 to 12 carbons or alkenyloxy having 2 to 12 carbons.

4. The liquid crystal composition according to claim 1, wherein a proportion of the first additive is in the range from 0.05% by weight to 10% by weight, and a proportion of the first component is in the range from 5% by weight to 50% by weight, based on the weight of the liquid crystal composition.

5. The liquid crystal composition according to claim 1, containing at least one compound represented by formula (3) as a second component:

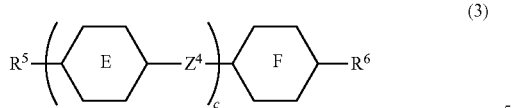

(3)

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, —CH$_2$CH$_2$—, —CH$_2$O—, —OCH$_2$—, —COO— or —OCO—; and c is 1, 2 or 3.

6. The liquid crystal composition according to claim 5, containing at least one compound selected from the group of compounds represented by formula (3-1) to formula (3-13) as the second component:

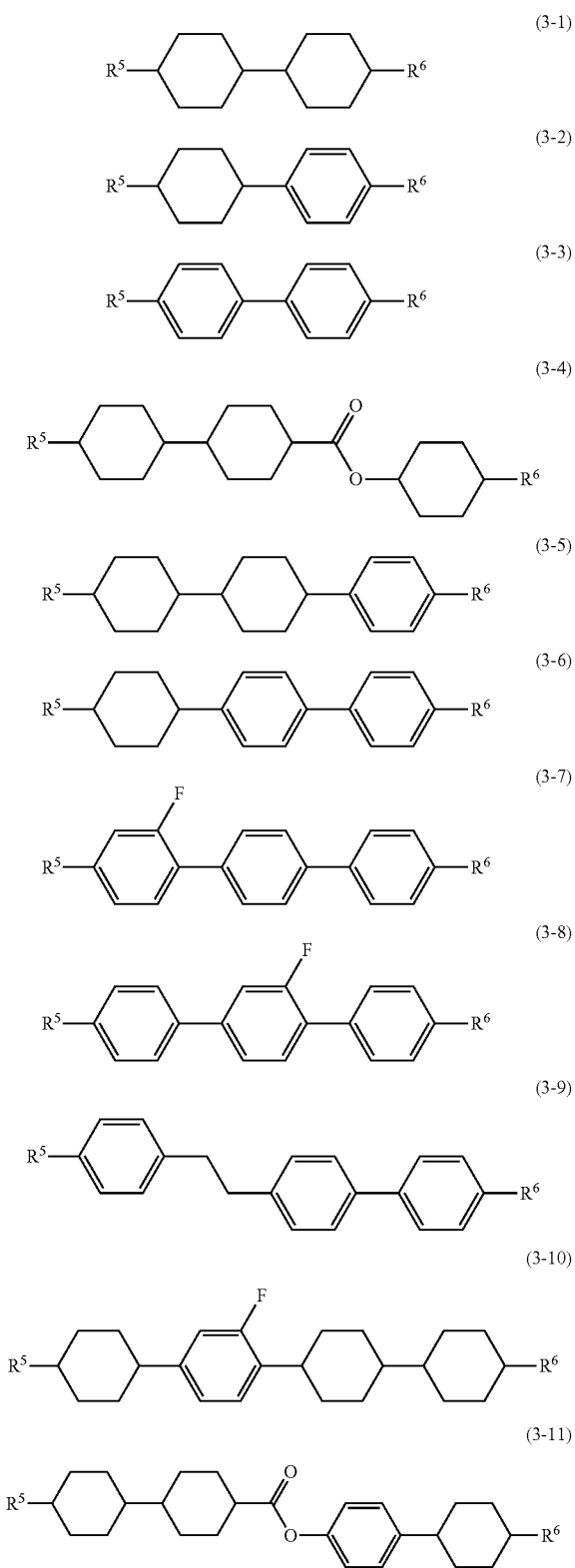

(3-12)

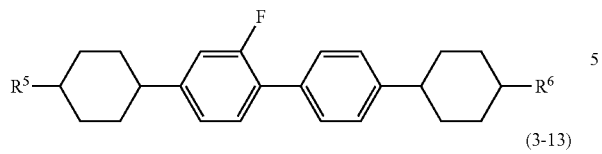

(3-13)

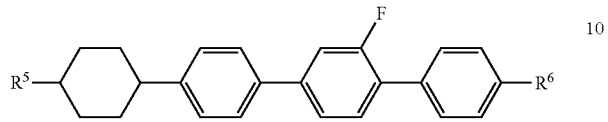

wherein, in formula (3-1) to formula (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

7. The liquid crystal composition according to claim 5, wherein a proportion of the second component is in the range from 10% by weight to 70% by weight based on the weight of the liquid crystal composition.

8. The liquid crystal composition according to claim 1, containing at least one compound represented by formula (4) as a third component:

(4)

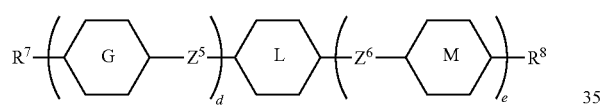

wherein, in formula (4), $R^7$ and $R^8$ are independently alkyl having 1 to 12 carbons, alkoxy having 1 to 12 carbons, alkenyl having 2 to 12 carbons or alkenyloxy having 2 to carbons; ring G and ring M are independently 1,4-cyclohexylene, 1,4-cyclohexenylene, 1,4-phenylene or tetrahydropyran-2,5-diyl; ring L is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, —CH$_2$CH$_2$—, —CH$_2$O—, —OCH$_2$—, —COO— or —OCO—; and d is 1, 2 or 3, e is 0 or 1, and a sum of d and e is 3 or less.

9. The liquid crystal composition according to claim 8, containing at least one compound selected from the group of compounds represented by formula (4-1) to formula (4-17) as the third component:

(4-1)

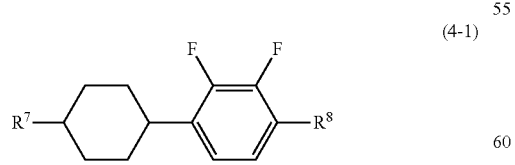

(4-2)

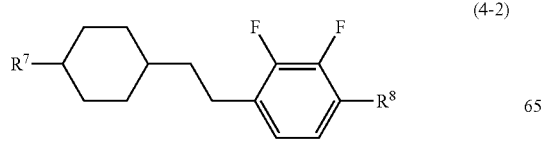

(4-3)

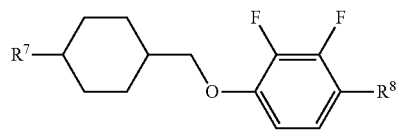

(4-4)

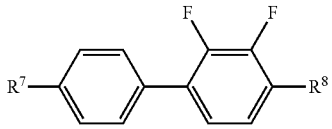

(4-5)

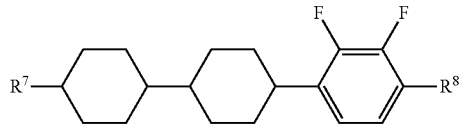

(4-6)

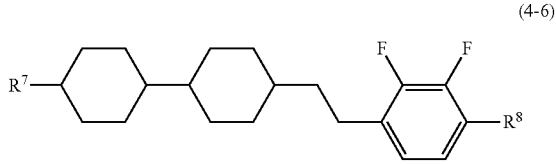

(4-7)

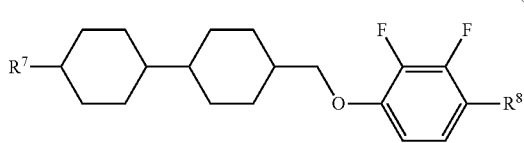

(4-8)

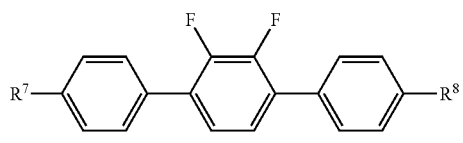

(4-9)

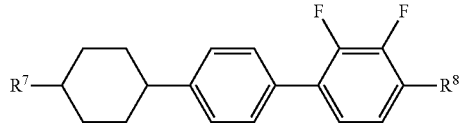

(4-10)

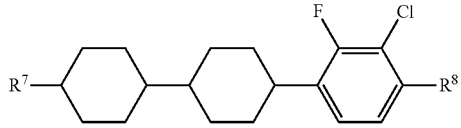

(4-11)

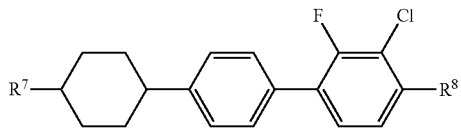

(4-12)

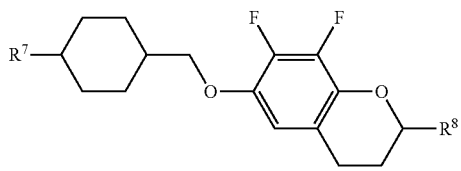

-continued

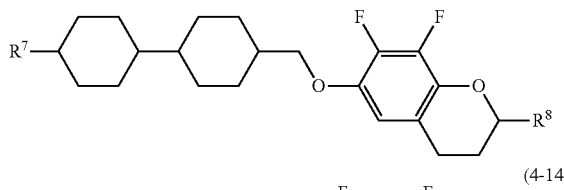
(4-13)

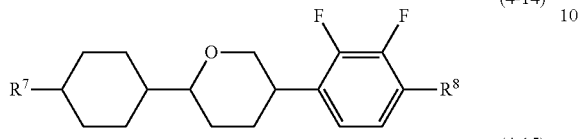
(4-14)

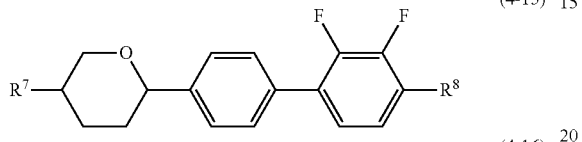
(4-15)

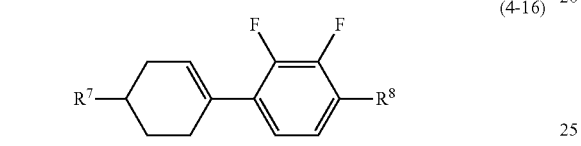
(4-16)

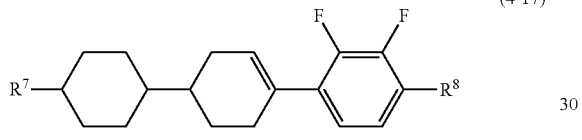
(4-17)

wherein, in formula (4-1) to formula (4-17), $R^7$ and $R^8$ are independently alkyl having 1 to 12 carbons, alkoxy having 1 to 12 carbons, alkenyl having 2 to 12 carbons or alkenyloxy having 2 to 12 carbons.

10. The liquid crystal composition according to claim 8, wherein a proportion of the third component is in the range from 5% by weight to 75% by weight based on the weight of the liquid crystal composition.

11. The liquid crystal composition according to claim 1, containing at least one compound represented by formula (5) as a second additive:

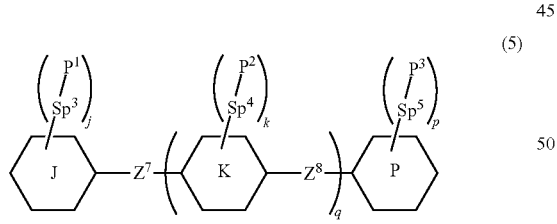
(5)

wherein, in formula (5), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^7$ and $Z^8$ are independently a single bond or alkylene having 1 to 10 carbons, and in the alkylene, at least one —$CH_2$— may be replaced by —O—, —CO—, —COO— or —OCO—, and at least one —$CH_2CH_2$— may be replaced by —CH=CH—, —C(CH$_3$)=CH—, —CH=C(CH$_3$)— or —C(CH$_3$)=C(CH$_3$)—, and in these groups, at least one hydrogen may be replaced by fluorine or chlorine; $P^1$, $P^2$ and $P^3$ are a polymerizable group; $Sp^3$, $Sp^4$ and $Sp^5$ are independently a single bond or alkylene having 1 to 10 carbons, and in the alkylene, at least one —$CH_2$— may be replaced by —O—, —COO—, —OCO— or —OCOO—, and at least one —$CH_2CH_2$— may be replaced by —CH=CH— or and in these groups, at least one hydrogen may be replaced by fluorine or chlorine; q is 0, 1 or 2; and j, k and p are independently 0, 1, 2, 3 or 4, and a sum of j, k and p is 1 or more.

12. The liquid crystal composition according to claim 11, wherein, in formula (5), $P^1$, $P^2$ and $P^3$ are independently a polymerizable group selected from the group of groups represented by formula (P-1) to formula (P-5):

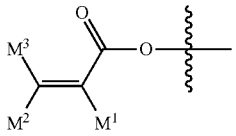
(P-1)

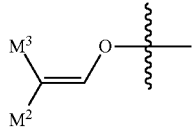
(P-2)

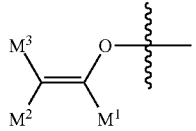
(P-3)

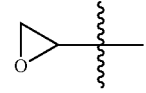
(P-4)

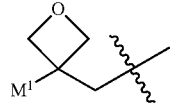
(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

13. The liquid crystal composition according to claim 11, wherein the second additive is at least one compound selected from the group of polymerizable compounds represented by formula (5-1) to formula (5-28):

(5-22)
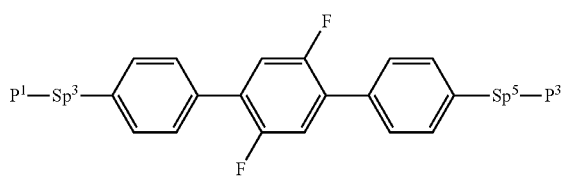

(5-23)
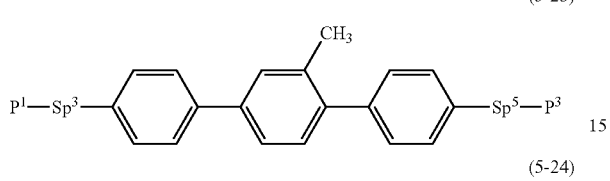

(5-24)
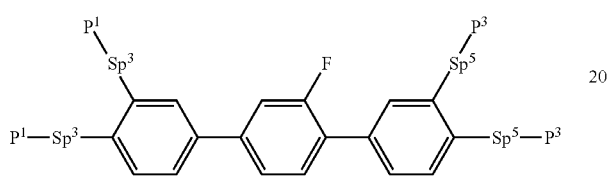

(5-25)
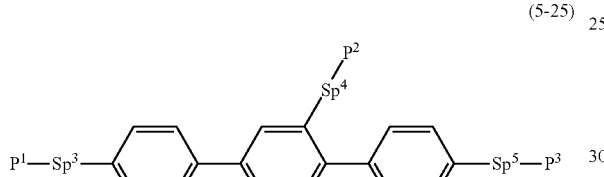

(5-26)
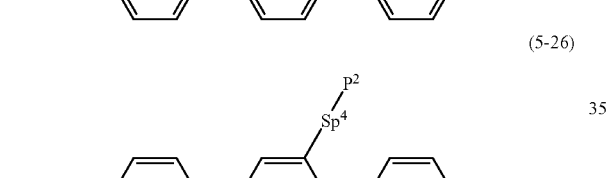

(5-27)
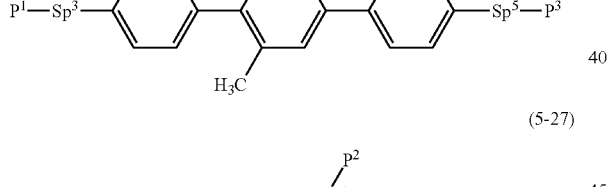

(5-28)
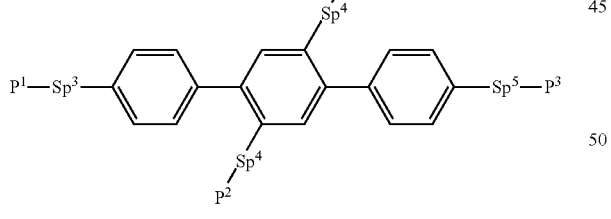

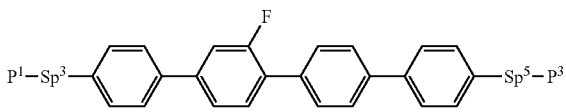

wherein, in formula (5-1) to formula (5-28), $P^1$, $P^2$ and $P^3$ are independently a polymerizable group selected from the group of groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine; and (P-1)
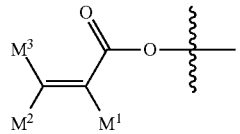

(P-2)
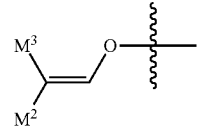

(P-3)
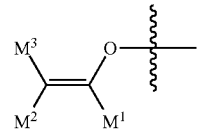

wherein, $Sp^3$, $Sp^4$ and $Sp^5$ are independently a single bond or alkylene having 1 to 10 carbons, and in the alkylene, at least one —CH$_2$— may be replaced by —O—, —OCO—, —OCO— or —OCOO—, and at least one —CH$_2$CH$_2$— may be replaced by —CH═CH— or —C≡C—, and in these groups, at least one hydrogen may be replaced by fluorine or chlorine.

14. The liquid crystal composition according to claim 11, wherein a proportion of the second additive is in the range from 0.03% by weight to 10% by weight based on the weight of the liquid crystal composition.

15. A liquid crystal display device, including the liquid crystal composition according to claim 1.

16. The liquid crystal display device according to claim 15, wherein an operating mode in the liquid crystal display device includes an IPS mode, a VA mode, an FFS mode or an FPA mode, and a driving mode in the liquid crystal display device includes an active matrix mode.

17. A polymer sustained alignment mode liquid crystal display device, wherein the liquid crystal display device includes the liquid crystal composition according to claim 11, and the first additive in the liquid crystal composition is polymerized, or the first additive and the second additive therein are polymerized.

18. A liquid crystal display device having no alignment film, wherein the liquid crystal display device includes the liquid crystal composition according to claim 11, and the first additive in the liquid crystal composition is polymerized, or the first additive and the second additive therein are polymerized.

19. The liquid crystal composition according to claim 5, containing at least one compound represented by formula (4) as a third component:

(4)
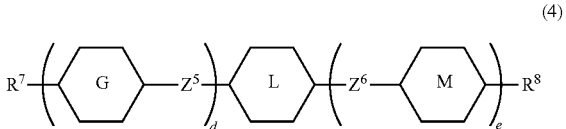

wherein, in formula (4), $R^7$ and $R^8$ are independently alkyl having 1 to 12 carbons, alkoxy having 1 to 12 carbons, alkenyl having 2 to 12 carbons or alkenyloxy having 2 to carbons; ring G and ring M are independently 1,4-cyclohexylene, 1,4-cyclohexenylene, 1,4-phenylene or tetrahydropyran-2,5-diyl; ring L is 2, 3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, —CH$_2$CH$_2$—, —CH$_2$O—, —OCH$_2$—, —COO— or —OCO—; and d is 1, 2 or 3, e is 0 or 1, and a sum of d and e is 3 or less.

20. The liquid crystal composition according to claim 19, containing at least one compound represented by formula (5) as a second additive:

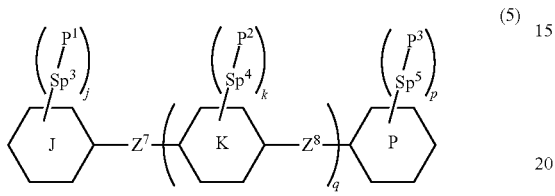

(5)

wherein, in formula (5), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^7$ and $Z^8$ are independently a single bond or alkylene having 1 to 10 carbons, and in the alkylene, at least one —CH$_2$— may be replaced by —O—, —CO—, —COO— or —OCO—, and at least one —CH$_2$CH$_2$— may be replaced by —CH=CH—, —C(CH$_3$)=CH—, —CH=C(CH$_3$)— or —C(CH$_3$)=C(CH$_3$)—, and in these groups, at least one hydrogen may be replaced by fluorine or chlorine; $P^1$, $P^2$ and $P^3$ are a polymerizable group; $Sp^3$, $Sp^4$ and $Sp^5$ are independently a single bond or alkylene having 1 to 10 carbons, and in the alkylene, at least one —CH$_2$— may be replaced by —O—, —COO—, —OCO— or —OCOO—, and at least one —CH$_2$CH$_2$— may be replaced by —CH=CH— or —C≡—, and in these groups, at least one hydrogen may be replaced by fluorine or chlorine; q is 0, 1 or 2; and j, k and p are independently 0, 1, 2, 3 or 4, and a sum of j, k and p is l or more.

* * * * *